United States Patent
Cadiau et al.

(10) Patent No.: US 11,285,426 B2
(45) Date of Patent: Mar. 29, 2022

(54) METHODS OF CAPTURING OF $CO_2$ AND $H_2O$

(71) Applicant: King Abdullah University of Science and Technology, Thuwal (SA)

(72) Inventors: Amandine Cadiau, Thuwal (SA); Karim Adil, Thuwal (SA); Youssef Belmabkhout, Thuwal (SA); Prashant M. Bhatt, Thuwal (SA); Mohamed Eddaoudi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 319 days.

(21) Appl. No.: 16/500,548

(22) PCT Filed: Apr. 5, 2018

(86) PCT No.: PCT/IB2018/052371
§ 371 (c)(1),
(2) Date: Oct. 3, 2019

(87) PCT Pub. No.: WO2018/185705
PCT Pub. Date: Oct. 11, 2018

(65) Prior Publication Data
US 2020/0114301 A1    Apr. 16, 2020

Related U.S. Application Data

(60) Provisional application No. 62/481,865, filed on Apr. 5, 2017.

(51) Int. Cl.
*B01D 53/02* (2006.01)
*B01D 53/04* (2006.01)
(Continued)

(52) U.S. Cl.
CPC ........ *B01D 53/0462* (2013.01); *B01J 20/226* (2013.01); *B01J 20/3425* (2013.01);
(Continued)

(58) Field of Classification Search
CPC .......... B01D 2253/204; B01D 2256/24; B01D 2256/245; B01D 2257/504;
(Continued)

(56) References Cited

U.S. PATENT DOCUMENTS 3,511,030 A * 5/1970 Brown ...................... B03C 3/66
96/25
9,138,719 B1   9/2015 Eddaoudi et al.
(Continued)

FOREIGN PATENT DOCUMENTS

WO    2016162830 A1    10/2016
WO    2016162834 A1    10/2016
WO    2016162835 A1    10/2016

OTHER PUBLICATIONS

Search Report and Written Opinion for PCT/IB2018/052371 dated Jun. 22, 2018.
(Continued)

*Primary Examiner* — Christopher P Jones
(74) *Attorney, Agent, or Firm* — Billion & Armitage

(57) ABSTRACT

Embodiments of the present disclosure describe a method of capturing chemical species from a fluid composition comprising providing a metal-organic framework characterized by the formula $M_aM_bF_5(O/H_2O)(pyrazine)_2 \cdot x(solv)$, wherein $M_a$ is $Ni^{2+}$; $M_b$ is $Nb^{5+}$, $Al^{3+}$, or $Fe^{3+}$; x is from 0 to 10 and solv is one or more of $H_2O$, $CO_2$, DMF, EtOH, NMP, MeOH; contacting the metal-organic framework with a fluid composition including $H_2O$, $CO_2$, and one or more other chemical species; and capturing $H_2O$ and $CO_2$ simultaneously from the fluid composition.

19 Claims, 42 Drawing Sheets

(51) Int. Cl.
B01J 20/22 (2006.01)
B01J 20/34 (2006.01)
(52) U.S. Cl.
CPC ..... B01J 20/3483 (2013.01); *B01D 2253/204* (2013.01); *B01D 2257/504* (2013.01); *B01D 2257/80* (2013.01)
(58) Field of Classification Search
CPC ............. B01D 2257/80; B01D 53/0462; B01J 20/226; B01J 20/3425; B01J 20/3483; Y02C 10/08
See application file for complete search history.

(56) References Cited

U.S. PATENT DOCUMENTS

| | | | |
|---|---|---|---|
| 9,604,195 | B2 | 3/2017 | Eddaoudi et al. |
| 10,377,786 | B2 | 8/2019 | Eddaoudi et al. |
| 2017/0203261 | A1* | 7/2017 | Eddaoudi ............... B01D 69/10 |
| 2017/0246615 | A1* | 8/2017 | Eddaoudi ............. B01J 20/3208 |
| 2017/0247622 | A1 | 8/2017 | Eddaoudi et al. |
| 2018/0006315 | A1* | 1/2018 | Pierpont ............... H01M 8/188 |

OTHER PUBLICATIONS

Bhatt, et al., "A Fine-Tuned Fluorinated MOF Addresses the Needs for Trace CO2 Removal and Air Capture Using Physisorption", Journal of the American Chemical Society, vol. 138, Jul. 8, 2016, pp. 9301-9307.

Burd, et al., "Highly Selective Carbon Dioxide Uptake by [Cu(bpy-n)2(SiF6)](bpy-1=4,4'-Bipyridine; bpy-2=1,2-Bis(4-pyridyl)ethene)", Journal of the American Chemical Society, vol. 134, Feb. 8, 2012, pp. 3663-3666.

Cadiau, et al., "A Metal-Organic Framework-Based Splitter for Separating Propylene From Propane", Science, vol. 353, Issue 6295, Jul. 8, 2016, pp. 137-140.

Cadiau, et al., "Hydrothermal Synthesis, ab-initio Structure Determination and NMR Study of the First Mixed Cu-Al Fluorinated MOF", CrystEngComm, vol. 15, 2013, pp. 3430-3435.

Gautier, et al., "Orientational Order of [VOF5]2- and [NbOF5]2- Polar Units in Chains", Journal of Solid State Chemistry, vol. 195, 2012, pp. 132-139.

Halasyamani, et al., "Syntheses and Structures of Two New Cu/Nb/Pyrazine Complexes: Three Dimensional CuNb(pyz)2OF5 · (pyz)(H2O) and Two Dimensional [Cu(pyz)2.5]+[NbF6]-· (pyz)", Zeitschrift fur Anorganische und Allgemeine Chemie, vol. 622, 1996, pp. 479-485.

Heier, et al., "The Polar [WO2F4]2-Anion in the Solid State", Inorganic Chemistry, vol. 38, No. 4, Feb. 2, 1999, pp. 762-767.

Kumar, et al., "Direct Air Capture of CO2 by Physisorbent Materials", Angewandte Chemie International Edition, vol. 54, 2015, pp. 14372-14377.

Lin, et al., "Microporosity, Optical Bandgap Sizes, and Photocatalytic Activity of M(I)-Nb(V) (M=Cu, Ag) Oxyfluoride Hybrids", Crystal Growth & Design, vol. 10, No. 3, Jan. 8, 2010, pp. 1323-1331.

Maggard, et al., "Understanding the Role of Helical Chains in the Formation of Noncentrosymmetric Solids", Journal of the American Chemical Society, vol. 123, 2001, pp. 7742-7743.

Noro, et al., "A New, Methane Adsorbent, Porous Coordination Polymer [{CuSiF6(4,4'-bipyridine)2}n]", Angewandte Chemie International Edition, vol. 39, No. 12, 2000, pp. 2081-2084.

Noro, et al., "Framework Engineering by Anions and Porous Functionalities of Cu(II)/4,4'-bpy Coordination Polymers", Journal of the American Chemical Society, vol. 124, No. 11, Feb. 20, 2002, pp. 2568-2583.

Nugent, et al., "Enhancement of CO2 Selectivity in a Pillared pcu MOM Platform Through Pillar Substitution", Chemical Communications, vol. 49, Jan. 9, 2013, pp. 1606-1608.

Nugent, et al., "Porous Materials With Optimal Adsorption Thermodynamics and Kinetics for CO2 Separation", Nature, vol. 495, Mar. 7, 2013, pp. 80-84.

Shekhah, et al., "Made-to-Order Metal-Organic Frameworks for Trace Carbon Dioxide Removal and Air Capture", Nature Communications, vol. 5, Article No. 4228, Jun. 25, 2014, pp. 1-7.

Subramanian, et al., "Porous Solids by Design:[Zn(4,4'-bpy)2(SiF6)]n·XDMF, a Single Framework Octahedral Coordination Polymer with Large Square Channels", Angewandte Chemie International Edition, vol. 34, No. 19, 1995, pp. 2127-2129.

Uemura, et al., "Syntheses, Crystal Structures and Adsorption Properties of Ultramicroporous Coordination Polymers Constructed from Hexafluorosilicate Ions and Pyrazine", European Journal of Inorganic Chemistry, vol. 2009, Apr. 8, 2009, pp. 2329-2337.

Ziaee, et al., "Theoretical Optimization of Pore Size and Chemistry in SIFSIX-3-M Hybrid Ultramicroporous Materials", Crystal Growth & Design, vol. 16, May 27, 2016, pp. 3890-3897.

* cited by examiner (AlF₅(H₂O))²⁻  SCXRD

FIG. 5B ↓ Dehydration

FIG. 5E  DFT

FIG. 5C ↓ Rehydration

FIG. 5H  Solid-State NMR

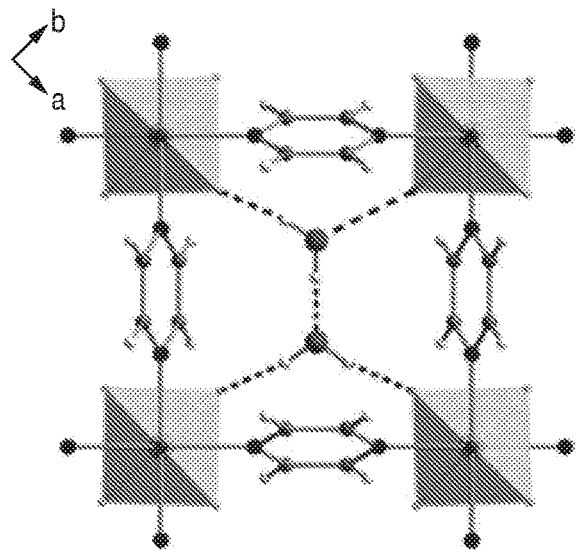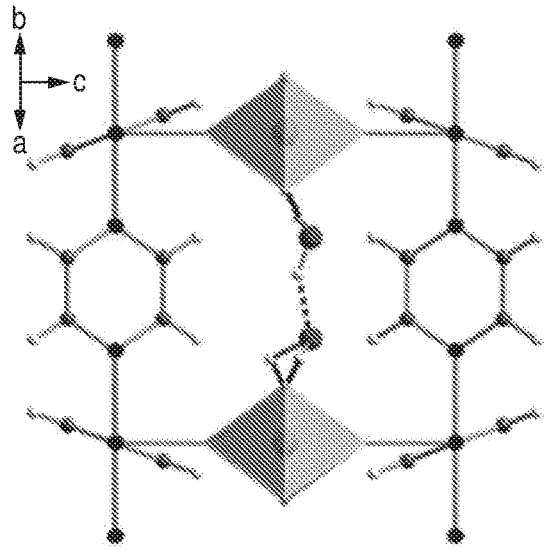
FIG. 9A    FIG. 9B
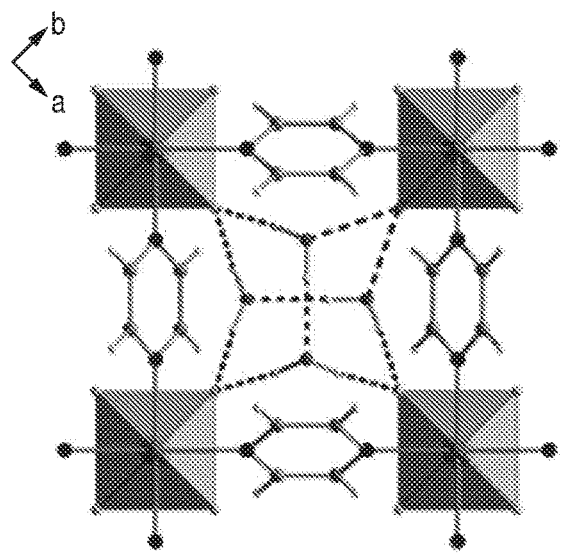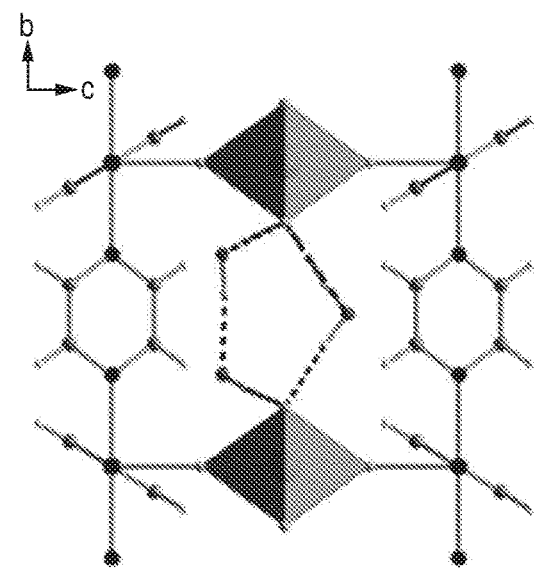
FIG. 9C    FIG. 9D

METHODS OF CAPTURING OF CO$_2$ AND H$_2$O

BACKGROUND

Carbon dioxide, a greenhouse gas, is frequently targeted for removal from natural gas and other industrial gas streams. Conventional technology for the removal of carbon dioxide is often a costly, multi-stage process because such gas streams must be dehydrated first before carbon dioxide removal. At least part of the reason is because water vapor interacts strongly with porous materials that exhibit physiosorption towards carbon dioxide. For instance, water vapor tends to interact strongly with unsaturated metal centers of the porous materials via chemical bonding. Water vapor also tends to interact moderately with hydrogen bonding sites of the porous materials via hydrogen bonding. The porous materials ultimately proved ineffective at carbon dioxide removal because carbon dioxide and water vapor compete as they fight to occupy the same adsorption sites. To overcome these limitations, gas streams containing both carbon dioxide and water, among other chemical species, must be dehydrated before carbon dioxide may be removed therefrom. However, dehydration via conventional drying agents—such as, activated alumina and inorganic molecular sieves—is an energy-intensive process, requiring high temperatures to regenerate the drying agent, and expensive.

SUMMARY

In general, embodiments of the present disclosure describe methods of capturing water and carbon dioxide.

Accordingly, embodiments of the present disclosure describe a method of capturing chemical species from a fluid composition comprising providing a metal-organic framework characterized by the formula $M_aM_bF_5(O/H_2O)$(pyrazine)$_2$.x(solv), wherein $M_a$ is Ni$^{2+}$; $M_b$ is Nb$^{5+}$, Al$^{3+}$, or Fe$^{3+}$; x is from 0 to 10 and solv is one or more of H$_2$O, CO$_2$, DMF, EtOH, NMP, MeOH; contacting the metal-organic framework with a fluid composition including H$_2$O, CO$_2$, and one or more other chemical species; and capturing H$_2$O and CO$_2$ from the fluid composition.

Embodiments of the present disclosure further describe a method of capturing chemical species from a fluid composition comprising providing a metal-organic framework with a pillar, the pillar characterized by the formula $(M_bF_5(O/H_2O))^{2-}$ where $M_b$ is a trivalent metal cation; contacting the metal-organic framework with a fluid composition including H$_2$O, CO$_2$, and one or more other chemical species; and capturing H$_2$O and CO$_2$ simultaneously from the fluid composition.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 5A-J are schematic diagrams of as synthesized, dehydrated, and rehydrated forms of AlFFIVEH$_2$O-1-Ni, according to one or more embodiments of the present disclosure. In particular, FIGS. 5A-J relate to the following: A) the repetitive square motif in the Ni-pyrazine (4,4') square-grid layer. B) Projection along [001] of the crystal structure of AlFFIVEH$_2$O-1-Ni with a pcu topology illustrating the hosted water guest molecules connectivity within the one dimensional channel. C) Projection along [001] of the crystal structure of the dehydrated form of AlFFIVE-1-Ni showing the trigonal bipyramid (AlF$_5$)$^{2-}$ inorganic building block. D) Projection along [001] of the crystal structure of the rehydrated form AlFFIVEH$_2$O-1-Ni revealing the water molecule within the coordination sphere of Al$^{3+}$ cations. E)-F)-G)-H) DFT calculation by applying a progressive removal of H$_2$O molecules (from 3 to 0 per unit cell) on AlFFIVEH$_2$O-1-Ni confirming the crystal structure of the as synthesized form and the dehydration mechanism. I) $^1$H and J)$^{27}$Al (right) MAS NMR spectra of AlFFIVEH$_2$O-1-Ni recorded on as-synthesized sample (†), sample previously heated at 105° C. under vacuum for 8 hours (‡) and rehydrated sample confirming the departure and the reversion of water molecules within the materials (§). I) $^{19}$F-$^{19}$F 2D solid-state NMR confirming the correlation between fluorine atoms located on equatorial positions of the (AlF$_5$(H$_2$O))$^{2-}$ inorganic building block.

FIGS. 9A-D are projections along [001] and [101], according to one or more embodiments of the present disclosure. In particular, FIGS. 9A-D relate to the following: A) and B) projection along [001] and [101] of AlFFIVEH$_2$O-1-Ni crystal structure. C) and D) projection along [001] and [101] of FeFFIVEH$_2$O-1-Ni crystal structure.

FIG. 17 is a graphical view of $^{19}$F MAS NMR spectra of AlFFIVEH$_2$O-1-Ni recorded on the as synthesized sample (†), the dehydrated sample (‡), and the rehydrated sample (§).

DETAILED DESCRIPTION

The invention of the present disclosure relates to metal-organic frameworks for the simultaneous capture/removal of water and carbon dioxide from various fluid compositions. In particular, the invention of the present disclosure relates to metal-organic frameworks with a high selectivity for water and carbon dioxide over one or more other chemical species present in a fluid composition (e.g., gas stream). The metal-organic frameworks may include a periodic array of open metal coordination sites and fluorine moieties within a contracted square-shaped one-dimensional channel, wherein water preferentially adsorbs to the open metal coordination sites and carbon dioxide preferentially adsorbs via interactions with the fluorine moieties. Water and carbon dioxide thus may be simultaneously captured at distinct adsorption sites, eliminating or minimizing competition between and among water and carbon dioxide for the same adsorption sites. In addition, the adsorption behavior and uptake of water and carbon dioxide may be independent of the concentration of carbon dioxide and water, respectively. In this way, the invention of the present disclosure provides an efficient, effective, and economically feasible method of removing carbon dioxide and water from natural gas and other industrial gas streams.

Definitions

The terms recited below have been defined as described below. All other terms and phrases in this disclosure shall be construed according to their ordinary meaning as understood by one of skill in the art.

As used herein, "fluid(s)" refers to one or more of a gas, liquid, or combination thereof. A gas or liquid may include one or more components. For example, a fluid may include a gas stream including $H_2O$, $CO_2$, $CH_4$, $N_2$, $H_2$, etc.

As used herein, "MOF" refers to metal-organic framework.

As used herein, "water" and/or "$H_2O$" may include solid, liquid, and/or gas/vapor phases.

As used herein, "carbon dioxide" and/or "$CO_2$" may include solid, liquid, and/or gas/vapor phases.

Figure 1:
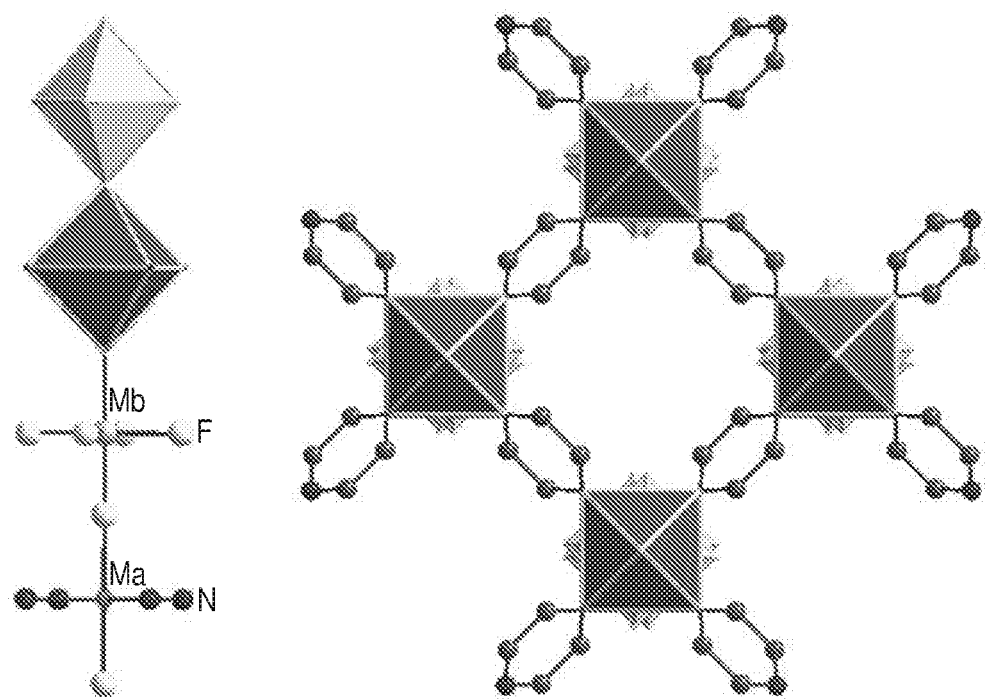
FIG. 1 is a schematic diagram of an inorganic chain and a metal-organic framework, according to one or more embodiments of the present disclosure.

FIG. 1 is a schematic diagram of an inorganic chain and a metal-organic framework, according to one or more embodiments of the present disclosure. Gas storage and separation using porous materials, such as metal-organic frameworks, have experienced significant development in recent years in various industrial applications related to energy, environment, and medicine. Among porous materials, metal organic frameworks are a versatile and promising class of crystalline solid state materials which allow porosity and functionality to be tailored towards various applications. MOF crystal chemistry uses a molecular building block (MBB) approach that offers potential to construct MOFs where desired structural and geometrical information are incorporated into the building blocks prior to the assembly process.

Generally, MOFs comprise a network of nodes and ligands, wherein a node has a connectivity capability at three or more functional sites, and a ligand has a connectivity capability at two functional sites each of which connect to a node. Nodes are typically metal ions or metal containing clusters, and, in some instances, ligands with node connectivity capability at two, three, or more functional sites can also be characterized as nodes. In some instances, ligands can include two functional sites capable of each connecting to a node, and one or more additional functional sites which do not connect to nodes within a particular framework. A MBB can comprise a metal-based node and an organic ligand which extrapolate to form a coordination network. Such coordination networks have advantageous crystalline and porous characteristics affecting structural integrity and interaction with foreign species (e.g., gases). The particular combination of nodes and ligands within a framework will dictate the framework topology and functionality. While essentially limitless combinations of nodes and ligands exist, to date, no MOF materials provide for the simultaneous removal of water and carbon dioxide.

Figure 2:
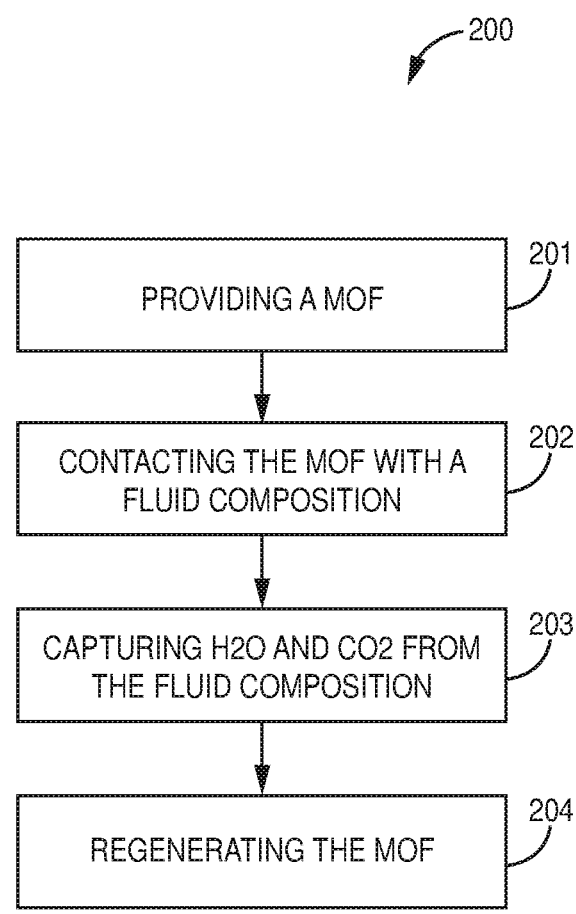
FIG. 2 is a flow chart of a method of capturing chemical species from a fluid composition, according to one or more embodiments of the present disclosure.

FIG. 2 is a flowchart of a method of capturing chemical species from a fluid composition, according to one or more embodiments. In particular, FIG. 2 provides a method of providing 201 a metal-organic framework, contacting 202 the metal-organic framework with a fluid composition, capturing 203 water and carbon dioxide from the fluid composition, and regenerating 204 the metal-organic framework. Although shown in FIG. 2, step 204 is optional.

At step 201, a metal-organic framework is provided. In many embodiments, the metal-organic framework that is provided may be characterized by the formula [(node)$_x$(ligand)$_y$(solvent)$_z$]. In many embodiments, the node may be characterized by the formula $M_aM_bF_5(O/H_2O)_w$, where $M_a$ is $Ni^{2+}$ and $M_b$ is one or more of $Nb^{5+}$, $Al^{3+}$, $Fe^{3+}$, $Fe^{5+}$, $V^{3+}$, and $V^{5+}$. In general, $M_b$ may include any metals with a +3 or +5 oxidation state (e.g., trivalent metal cations or pentavalent metal cations), including, but not limited to, one or more of $Al^{3+}$, $Fe^{3+}$, $La^{3+}$, $Rh^{3+}$, $Ti^{3+}$, $Cr^{3+}$, $Ga^{3+}$, $In^{3+}$, $Fe^{5+}$, $Nb^{5+}$, $V^{3+}$, and $V^{5+}$. The metal cations may include an oxidation state that permits the presence of a water molecule within the metal coordination sphere, wherein the water molecule may be removed via heating. In some embodiments, the metal cation is selected with an oxidation state such that the resulting MOF exhibits an octahedral fluorinated environment and leads to open metal coordination sites after coordinated water removal via proper activation (e.g., heating). In some embodiments, trivalent metal cations give access to open metal sites. In some embodiments, pentavalent metal cations may provide a confined space and high charge density.

In one embodiment, the metal-organic framework that is provided may be characterized by the formula $M_aM_bF_5(O/H_2O)(pyrazine)_2 \cdot x(solv)$, wherein $M_a$ is $Ni^{2+}$; $M_b$ is $Nb^{5+}$, $Al^{3+}$, $Fe^{3+}$, $Fe^{5+}$, $V^{3+}$, or $V^{5+}$; x is from 0 to 10 and solv is one or more of $H_2O$, $CO_2$, DMF, EtOH, NMP, and MeOH.

In other embodiments, an inorganic pillar of the metal-organic framework may be used to characterize the metal-organic framework. The inorganic pillar may be characterized as $(M_bF_5(O/H_2O))^{2-}$, where $M_b$ is $Nb^{5+}$, $Al^{3+}$, $Fe^{3+}$, $Fe^{5+}$, $V^{3+}$, $V^{5+}$, or any trivalent or pentavalent metal cation. In some embodiments, the metal-organic framework is one or more of $NiNbOF_5(pyrazine)_2 \cdot 2H_2O$ (NbOFFIVE-Ni-1) where $(NbOF_5)^{2-}$ is the inorganic pillar, $NiAlF_5(H_2O)(pyrazine)_2 \cdot 2H_2O$ (AlFFIVEH$_2$O-1-Ni) where $(AlF_5(H_2O))^{2-}$ is the inorganic pillar, and $NiFeF_5(H_2O)(pyrazine)_2 \cdot 4H_2O$ (FeFFIVEH$_2$O-1-Ni) where $(FeF_5(H_2O))^{2-}$ is the inorganic pillar.

The MOFs of the present disclosure may be hydrolytically stable. The MOFs may be highly stable in the presence of water. The MOFs may also exhibit high thermal stability. For example, in some embodiments, the MOFs may maintain crystallinity at temperatures up to about 250° C. In other embodiments, the MOFs may maintain crystallinity up to about 400° C.

In addition, the MOFs may include a periodic array of open metal coordination sites and fluorine moieties within a contracted square-shaped one-dimensional channel. In some embodiments, the MOFs include a double-bonded oxygen exposed within a confined space. In many embodiments, the MOFs crystallize in a tetragonal space group and adopt a primitive cubic (pcu) topology. While the MOFs of the present disclosure exhibit high affinity and/or selectivity towards $CO_2$, the MOFs may be tuned via selection of the metal cation to introduce open metal coordination sites to enhance the affinity for water without affecting $CO_2$ adsorption of the MOF. This is the first time fluorinated MOFs with high uniform charge density and small pore sizes have been used for $H_2O$ adsorption at low concentrations of $H_2O$.

The ligand may include any bi-functional ligand. In general, the ligand may include any nitrogen-containing ligand with two nitrogen atoms. In many embodiments, the ligand may include pyrazine. In some embodiments, the ligand may include one or more nitrogen atoms or two or more nitrogen atoms. In other embodiments, the ligand may include a nitrogen-containing heterocyclic ligand, such as one or more of pyridine, pyrazine, pyrimidine, triazine, imidazole, triazole, oxadiazole, and thiadiazole.

The solvent may include any chemical species present after fabrication of the metal-organic framework. In many embodiments, the solvent includes water. In other embodiments, the solvent may include one or more of water, dimethylformamide (DMF), diethylformamide (DEF), and alcohols, among other types of solvents. In another embodiment, the solvent may include one or more of water, carbon dioxide, DMF, ethanol, methanol, and N-Methyl-2-pyrrolidone.

At step 202, the metal-organic framework is contacted with a fluid composition. In many embodiments, the metal-organic framework is contacted with a fluid composition including $H_2O$, $CO_2$, and one or more other chemical species (e.g., natural gas and/or industrial gas). The one or more other chemical species of the fluid composition may include one or more of $N_2$, $H_2$, $CH_4$, n-$C_4H_{10}$, iso-$C_4H_{10}$, 1-propanol, and isopropanol. In other embodiments, the one or more other chemical species may include any hydrocarbon having 2 or more carbons, saturated or unsaturated, linear or branched. While the fluid composition in many embodiments includes $H_2O$ and $CO_2$, the fluid composition in other embodiments may include only $H_2O$ and one or more other chemical species, or only $CO_2$ and one or more other chemical species.

At step 203, water and carbon dioxide are captured. In many embodiments, water and carbon dioxide are simultaneously captured from the fluid composition, producing a raffinate including valuable chemical species (e.g., one or more of $N_2$, $H_2$, $CH_4$, n-$C_4H_{10}$, iso-$C_4H_{10}$, 1-propanol, isopropanol, and any linear or branched, hydrocarbons). Water and carbon dioxide may be captured at distinct adsorption sites. In many embodiments, water may be preferentially captured at open metal coordination sites of the metal-organic framework (e.g., unsaturated metal centers) and/or carbon dioxide may be preferentially captured via interactions with one or more of fluorine atoms of pillars and hydrogen atoms of the ligand (e.g., pyrazine). In some embodiments, the open metal coordination sites may be created via heating. The heating may be used to remove solvent (e.g., water) and to create the open metal site.

The capture of water and carbon dioxide at distinct adsorption sites provides numerous benefits. For example, although water and carbon dioxide may compete for the same adsorption sites in conventional adsorbents, the capture of water and carbon dioxide via the MOF of the present disclosure occurs at distinct adsorption sites, thus preventing and/or minimizing any competitive interactions between the two and providing for an efficient, effective, and selective adsorption. In addition, the adsorption behavior and/or uptake of water may be independent of the concentration of carbon dioxide present in the fluid composition and may also be independent of the presence of one or more other chemical species of the fluid composition. Similarly, the adsorption behavior and/or uptake of carbon dioxide may be independent of the concentration of water present in the fluid composition and may also be independent of the presence of one or more other chemical species of the fluid composition.

The MOFs may exhibit a selectivity for $H_2O/CO_2$ ranging from about 0.1 to about 100 or an inverse selectivity in favor of $CO_2$. In some embodiments, the MOFs may exhibit a selectivity for $H_2O/CO_2$ ranging from about 2 to 39. The selectivity of the MOFs for $H_2O/CO_2$ is unprecedented and very high, especially given that $CO_2$ and $H_2O$ always compete for adsorption sites. In addition, the MOFs may exhibit noticeable water update capacity at low partial pressures and/or concentrations of water. For example, in some embodiments, the MOF may exhibit water adsorption capacities with an associated saturation of about 18% to about 22% at low partial pressures (e.g., $P/P_0$=about 0.01 to about 0.05) and 298K. The MOFs may exhibit noticeable carbon dioxide uptake at low partial pressures and/or concentrations of carbon dioxide. For example, in some embodiments, the MOF may be saturated at a low partial pressure (e.g., $P/P_0$=about 0.01 to about 0.05) and 298K. In some embodiments, the uptake capacity at low partial pressures may be observed due to high and/or uniform localized charge density in contacted one-dimensional channels.

In one embodiment, the MOF captures about 50 $cm^3/cm^3$ (1.3 mmol/g) of $CO_2$ at 400 ppm and 298 K. As the temperature increases, the MOF captures an increasing amount of $CO_2$ at 400 ppm (e.g., 12 $cm^3/cm^3$ at 328K).

The MOFs may exhibit a greater affinity for either water in some embodiments or for carbon dioxide in other embodiments, all while maintaining a much greater affinity for water and carbon dioxide collectively relative to the one or more other chemical species sufficient to achieve an effective separation. For instance, in some embodiments, carbon dioxide's interactions with the MOF may be weaker and/or substantially weaker than water's interactions with the MOF, even though carbon dioxide and water's interactions with the MOF are still sufficiently strong relative to the other chemical species to achieve an effective separation. In these instances, the MOF has a greater relative affinity for water than carbon dioxide. In other embodiments, water's interactions with the MOF may be weaker and/or substantially weaker than carbon dioxide's interactions with the MOF, even though carbon dioxide and water's interactions with the MOF are still sufficiently strong relative to the other chemical species to achieve an effective separation. In these instances, the MOF has a greater relative affinity for carbon dioxide than water.

At step 204, the MOF is regenerated. In many embodiments, complete and/or substantially complete regeneration/desorption of the MOF requires only a moderate temperature relative to conventional drying agents, such as activated alumina or inorganic molecular sieves, which require energy-intensive processes due to the high temperatures required for regeneration. In general, the regeneration/desorption temperature may vary between about 25° C. to about 105° C. For instance, in one embodiment, the regeneration/desorption temperature may be less than about 150° C. In these embodiments, temperatures less than about 150° C. may prevent detrimental coke formation, such as may be the case where dehydration and/or gas capture is carried out in the presence of hydrocarbons and/or VOC at high temperatures. In another embodiment, the regeneration/desorption temperature may be about 100° C. (e.g., about 105° C.). In other embodiments, the MOF may be regenerated via temperature swing regeneration between about 55° C. to about 105° C. or vacuum swing regeneration at isothermal temperatures between about 55° C. to about 105° C. In some embodiments, the water and/or carbon dioxide desorption temperature and/or associated recycling energy may be reduced by about one-half (e.g., about 50%) relative to conventional solid dehydrators. The time for regeneration/desorption may vary depending on temperature. A structural relaxation of the MOF may facilitate regeneration of the MOF. In other embodiments, regeneration/desorption may be achieved via flushing with a less adsorbable gas (e.g., $N_2$). Although step 204 is shown in FIG. 2, step 204 is optional.

The selectivity of the MOFs for $CO_2$ and $H_2O$ may be tuned based on the selection of the metal cation. For example, in many embodiments, selecting a trivalent metal cation for $M_b$ may tune a selectivity of the MOF to favor $H_2O$ over $CO_2$, while still maintaining an overall selectivity for the simultaneous capture of both $H_2O$ and $CO_2$. In the alternative or in addition, in many embodiments, selecting a pentavalent metal cation for $M_b$ may tune a selectivity of the MOF to favor $CO_2$ over $H_2O$, while still maintaining an overall selectivity for the simultaneous capture of both $H_2O$ and $CO_2$.

Another embodiment of the present disclosure describes a method of capturing chemical species from a fluid composition comprising providing a metal-organic framework, the metal-organic framework including a pillar characterized by the formula $(M_bF_5(O/H_2O))^{2-}$, where $M_b$ is a metal with a +3 or +5 oxidation state (e.g., trivalent or pentavalent metal cations); contacting the metal-organic framework with a fluid composition including $H_2O$, $CO_2$, and one or more other chemical species; and capturing $H_2O$ and $CO_2$ simultaneously from the fluid composition.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE

AlFFIVE-1-Ni and FeFFIVE-1-Ni

This Example describes highly stable, fluorinated metal-organic frameworks (MOFs) with a high selectivity for water and carbon dioxide. For instance, the selective removal of both $H_2O$ and $CO_2$ in $N_2$ containing streams was observed. To construct such a MOF, using reticular chemistry and appropriate inorganic molecular building blocks, the introduction of open (e.g., unsaturated) metal coordination sites in fluorinated MOFs was targeted, among other things. In addition, metal cations that permitted the introduction of open metal coordination sites were targeted. The resulting MOFs were characterized by a periodic array of open (e.g., unsaturated) metal coordination sites and fluorine moieties within a contracted square-shaped one-dimensional channel. Further, the resulting MOFs exhibit the proper pore system (e.g., size, shape, and functionality) ideally situated for selective water and $CO_2$ adsorption with low-energy requirements for regeneration/desorption. It is the alignment and exposure of a periodic array of open metal coordination sites, concurrently with fluorine moieties, within the confined pore system that afforded the formation of highly stable and adsorbents with selectivity for water and carbon dioxide.

The metal cation, open metal coordinate sites, and fluorine moieties, among other things, enhanced the MOFs' affinity for water molecules in the highly confined pore system without affecting $CO_2$ adsorption. For example, these characteristics permitted water and carbon dioxide to adsorb at distinct sites. In particular, water was observed to preferentially adsorb to the open metal coordination sites and carbon dioxide was observed to preferentially adsorb via interactions with the fluorine moieties. This is the first time fluorinated MOFs with high uniform charge density and small pore sizes have been investigated for $H_2O$ adsorption (e.g., as desiccants for gas dehydration) at very low concentrations of water.

Given the demonstrated high selectivity for water and carbon dioxide, the MOFs exhibited unprecedented multi-functionality. For example, the MOFs served as an energy-efficient and cost-effective desiccant for gas/vapor dehydration. As a desiccant, the MOFs were hydrolytically stable and exhibited (1) a high water selectivity in the presence of other components with a noticeable water uptake capacity at low $H_2O$ partial pressures/concentrations and (2) a low-energy requirement for regeneration/recycling/desorption as only a relatively moderate temperature for water regeneration/recycling/desorption is required, the temperature preferentially being below about 150° C. to preclude detrimental coke formation. For example, the water desorption temperature and the associated recycling energy were reduced by nearly half (50%) as compared to conventional solid dehydrators. In addition, the MOFs exhibited excellent $CO_2$ capture features at very low pressures, akin to air capture requirements, due to the resultant high and uniform localized charge density in contracted one-dimensional channels.

The obtained fluorinated MOFs $NiAlF_5(H_2O)(pyr)_2.2(H_2O)$ and its isomorph $NiFeF_5(H_2O)(pyr)_2.4(H_2O)$, also referred herein as AlFFIVE-1-Ni and FeFFIVE-1-Ni, were constructed using a suitable inorganic pillar, based on an octahedrally-coordinated metal center that permitted the accommodation of five fluoride anions ($F^-$) and a water molecule in its coordination sphere, to afford the concurrent incorporation of a periodic array of open metal coordination sites and fluorine moieties within the contracted square-shaped one-dimensional channel of the resultant isostructural MOF. Trivalent metals M(III) were the appropriate choice to target as a metal core in the looked-for inorganic pillar $[MF_5(H_2O)]^{2-}$. Accordingly, aluminum and iron cations were selected as both adopted an octahedral fluorinated environment. To fabricate fluorinated MOFs, a new set of experimental reaction conditions were developed—hydrothermal synthesis in a highly acidic solution (HF 48% in water)—to permit the in situ formation of the requisite inorganic pillar, $[MF_5(H_2O)]^{2-}$, and the subsequent construction of the targeted two novel fluorinated MOFs in the presence of pyrazine and Ni(II).

Breakthrough findings were evidenced by a series of complementary studies performed on the AlFFIVE-1-Ni and FeFFIVE-1-Ni, exposed to water vapor from a variety of gas mixture systems, e.g. pure gases/vapors, $CO_2/CH_4$ and $CO_2/N_2$. For example, single-crystal X-ray diffraction (SCXRD) measurements asserted the critical role of the exposed open metal coordination sites, within a precisely controlled square-shaped channels with periodically arrayed fluoride anions, for the selective water removal/capture in presence of $CO_2$, $CH_4$ and $N_2$. Markedly, calorimetric studies revealed a relatively low energy requirement for the MOF adsorbent regeneration/recycling as compared to the benchmark solid desiccants such as zeolite 4A. Furthermore, single/multi-component adsorption experiments attested to the proficiency of these new solid-state materials to selectively adsorb $H_2O$ and $CO_2$ from gas streams containing $N_2$, $CH_4$ and $C_{2+}$.

Analyses for C, H and N were carried out on a ThermoFinnigan Apparatus. Thermal gravimetric analyses (TGA) were performed under $N_2$ flow (25 ml/min) with a heating rate of about 5° C./min using a TA Q500 apparatus.

The powder X-ray diffraction, the variable humidity and variable temperature. Powder X-ray diffraction data (PXRD) were collected over the 2θ range 4-40° or 6-80° on a high resolution PANalytical X'Pert MPD-PRO diffractometer with Cu $K_{\alpha 1}$ radiation (λ=1.5406 Å, 45 kV/40 mA).

Single Crystal X-ray Diffraction data were collected using Bruker X8 PROSPECTOR APEX2 CCD diffractometer using Cu Kα(λ=1.54178 Å). Indexing was performed using APEX2 (Difference Vectors method). Data integration and reduction were performed using SaintPlus 6.01. Absorption correction was performed by multi-scan method implemented in SADABS. Space group was determined using XPREP implemented in APEX2. Structure was solved using Direct Methods (SHELXS-97) and refined using SHELXL-97 (full-matrix least-squares on $F^2$) contained WinGX v2014.1.

Low-pressure gas sorption measurements were performed on a fully automated Quadrasorb SI (for $N_2$ sorption screening) and Autosorb-iQ gas adsorption analyzer, (Quantachrome Instruments) at relative pressures up to 1 atm. The cryogenic temperatures were controlled using liquid nitrogen bath at 77 K. The bath temperature for the $CO_2$ sorption measurements was controlled using an ethylene glycol/$H_2O$ re-circulating bath.

Figure 3:
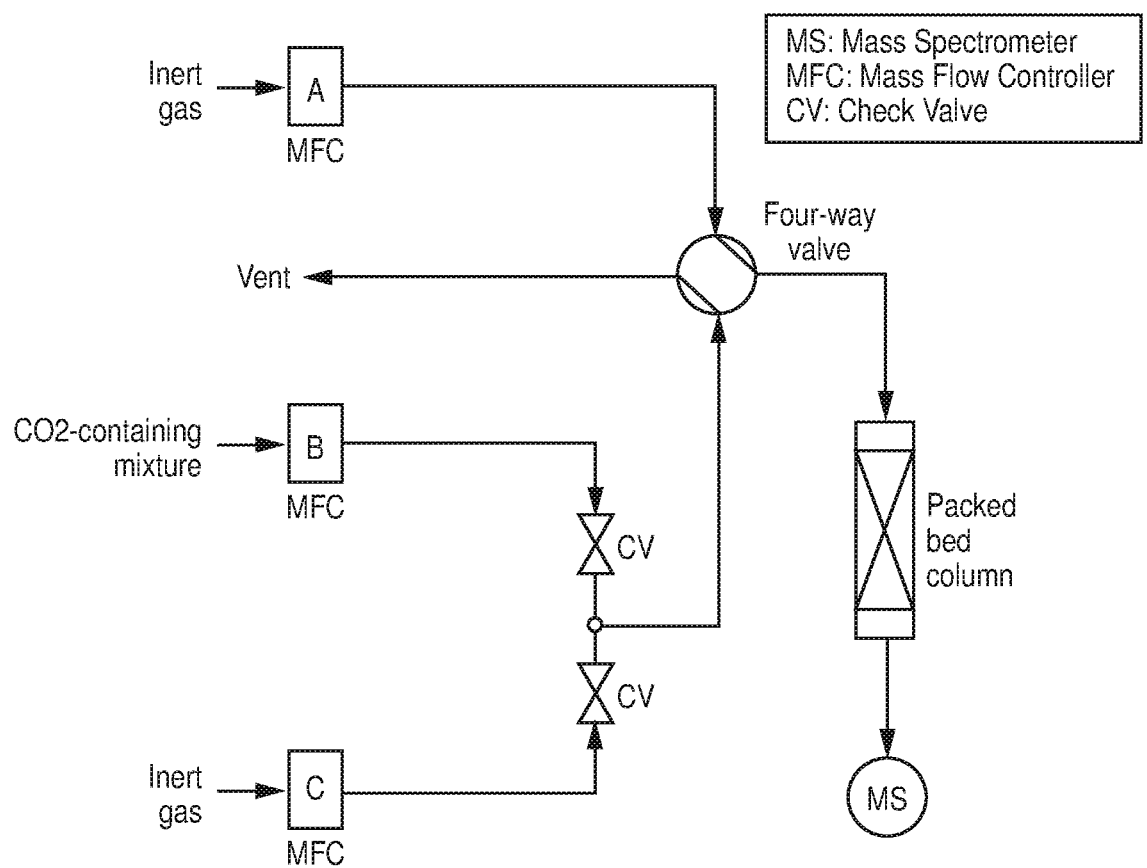
FIG. 3 is a schematic diagram of a representation of a column breakthrough setup, according to one or more embodiments of the present disclosure.

Column Breakthrough Test Set-up, Procedure and Measurements. The experimental set-up used for dynamic breakthrough measurements is shown in FIG. 3. The gas manifold consisted of three lines fitted with mass flow controllers. Line "A" was used to feed an inert gas, most commonly helium, to activate the sample before each experiment. The other two lines, "B" and "C," fed pure or pre-mixed gases. Whenever required, gases flowing through lines "B" and "C" may be mixed before entering a column packed with AlFFIVEH$_2$O-1-Ni using a four-way valve. In a typical experiment, 0.360 g of adsorbent (in the column) was treated at 105° C. overnight under vacuum in a separate oven.

After the sample was degassed, the column was backfilled with argon and mounted in the set-up. Before starting each experiment, helium reference gas was flushed through the column and then the gas flow was switched to the desired gas mixture at the same flow rate of 10 cm$^3$/g (20 cm$^3$/g in case of 1000 ppm $CO_2$). The gas mixture downstream the column was monitored using a Hiden mass-spectrometer.

Figure 4:
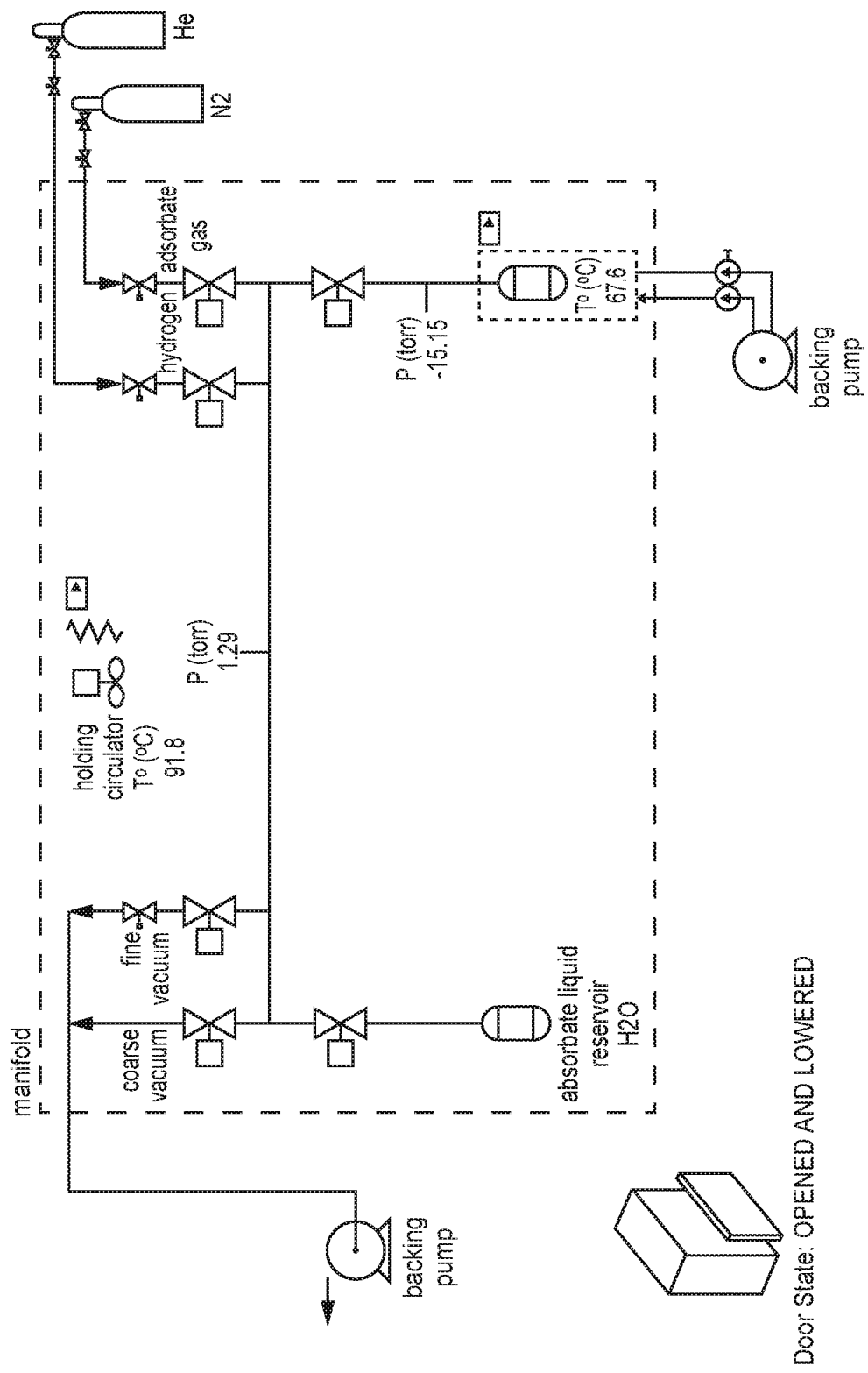
FIG. 4 is a schematic diagram of a Vstar[1] vapor sorption analyzer, according to one or more embodiments of the present disclosure.

Vstar$^1$ vapor sorption analyzer from Quantachrome instruments was used for water sorption (FIG. 4). In a typical experiment, sample was activated in-situ at 105° C. under dynamic vacuum for 8 hours. Temperature was increased to 105° C. from room temperature at the rate of 1° C./min. Activated sample was used for corresponding isotherm measurement. All the sorption experiments were carried out at 25° C. Manifold temperature was maintained at 90° C. throughout the measurement. Sorption data were processed by using Helmholtz equation.

TG-DSC experiment. The SENSYS evo TG-DSC instrument (Setaram Instrumentation) was used for heat of adsorption measurements at 25° C. in a flow of nitrogen. The obtained signal was then integrated to give the corresponding amount of heat in Joules. The increments of adsorption were read directly from the TG curve. For TG analysis, the samples were placed in platinum pans and, before each experiment, activated by heating in a nitrogen flow at 105° C. for 12 h and brought to the adsorption temperature. In each experiment, adsorption on the sample was performed after flushing the activated sample by nitrogen flow for about 1 hour.

Figure 5A:
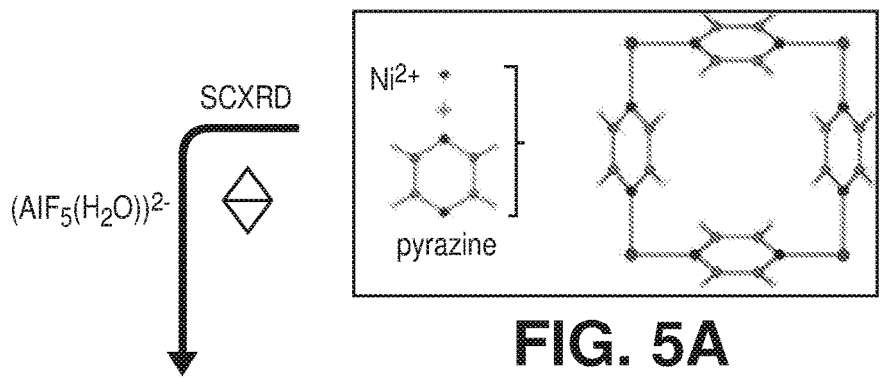
Figure 5F:
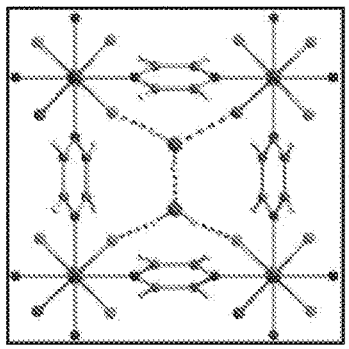
Figure 5F:
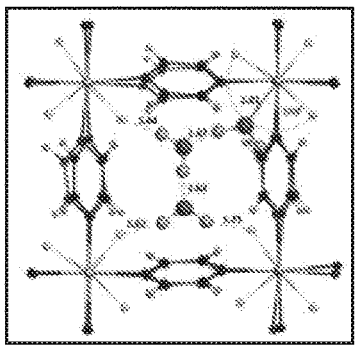
Figure 5F:
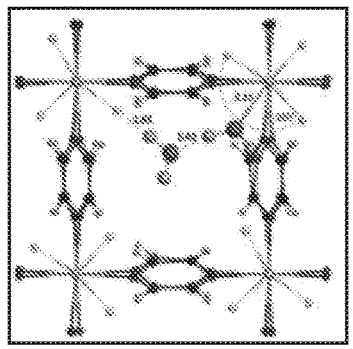
Figure 5G:
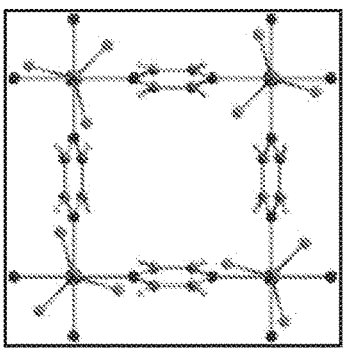
Figure 5G:
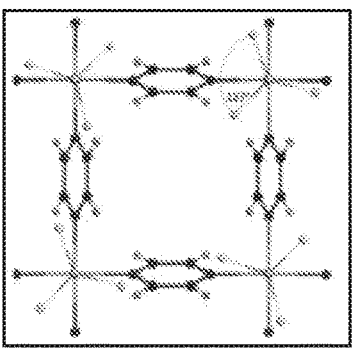
Figure 5G:
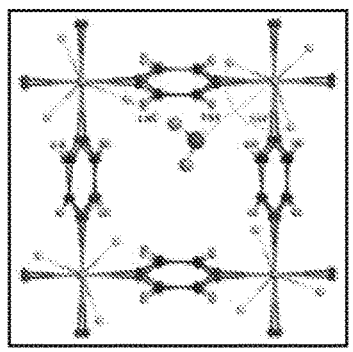
Figure 5D:
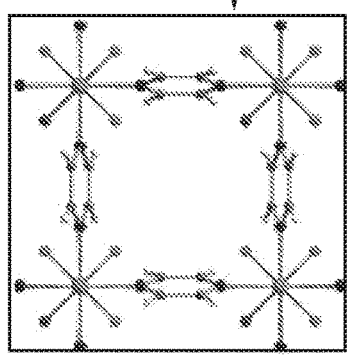

Hydrothermal reactions between pyrazine, $Ni(NO_3)_2 \cdot 6H_2O$ and $Al(NO_3)_3 \cdot 9H_2O$ (or $Fe(NO_3)_3 \cdot 9H_2O$) in the presence of HF$_{aq}$ (48%) yielded square-shaped crystals, suitable for the single crystal structure determination. Single-crystal X-ray diffraction (SCXRD) experiments were carried out to determine the crystal structure of these two extended structures, insoluble in water and common organic solvents. These two fluorinated MOFs crystalized in a tetragonal space group, (I4/mcm and P4/nbm for AlFFIVE-1-Ni and FeFFIVE-1-Ni, respectively) and adopted the expected primitive cubic (pcu) topology resulting from the pillaring of Ni(II)-pyrazine 2-periodic square-grid layers with $[MF_5(H_2O)]^{2-}$ (M=$Al^{3+}$ or $Fe^{3+}$) inorganic pillars (FIG. 5A). Single crystal X-ray structure data and refinement conditions for AlFFIVEH$_2$O-1-Ni are presented below in Table 1:

| | |
|---|---|
| Empirical formula | $C_5H_{14}AlF_5N_4NiO_3$ |
| Formula weight | 394.92 |
| Temperature | 296 K |
| Wavelength | 1.54178 Å |
| Crystal system, space group | Tetragonal, I4/mcm |
| Unit cell dimensions | a = 9.8610(4) Å, c = 15.2529(9) Å |
| Volume | 1483.2(2) Å$^3$ |
| Z, Calculated density | 4, 1.769 Mg m$^{-3}$ |
| Absorption coefficient | 3.183 mm$^{-1}$ |
| F(000) | 800 |
| Crystal size | 0.02 × 0.04 × 0.04 mm |
| Theta range for data collection | 8.6-66.6° |
| Limiting indices | −11 ≤ h ≤ 10, −5 ≤ k ≤ 11, −18 ≤ l ≤ 18 |
| Refection collected/unique | 2755/374 ($R_{int}$ = 0.030) |
| Completeness to $\theta_{max}$ = 66.6° | 98.4% |
| Max. and min. transmission | 0.753 and 0.663 |
| Refinement method | Full-matrix least-squares on F$^2$ |
| Data/restraints/parameters | 374/4/42 |
| Goodness-of-fit on F$^2$ | 1.02 |
| Final R indices [I > 2σ(I)] | $R_1$ = 0.024, $wR_2$ = 0.067 |
| R indices (all data) | $R_1$ = 0.025, $wR_2$ = 0.068 |
| Largest diff. peak and hole | 0.37 and −0.40 e Å$^{-3}$ |

Single crystal X-ray structure data and refinement conditions for AlFFIVEH$_2$O-1-Ni are presented below in Table 2:

| | |
|---|---|
| Empirical formula | $C_8H_8AlF_5N_4Ni$ |
| Formula Weight | 340.87 |
| Temperature | 398 K |
| Wavelength | 1.54178 Å |
| Crystal system, space group | Tetragonal, P4/mmm |
| Unit cell dimension | a = 7.0419(6) Å, c = 7.7049(8) Å |
| Volume | 382.07(8) Å$^3$ |
| Z, Calculated density | 1, 1.491 Mg m$^{-2}$ |
| Absorption coefficient | 2.849 mm$^{-1}$ |
| F(000) | 170 |
| Crystal size | 0.01 × 0.02 × 00.03 mm |
| Theta range for data collection | 5.7-66.4° |
| Limiting indices | −7 ≤ h ≤ 5, −5 ≤ k ≤ 8, −9 ≤ l ≤ 6 |
| Rejections collected/unique | 1557/239 ($R_{int}$ = 0.027) |
| Completeness to $\theta_{max}$ = 66.4° | 99.6% |
| Max. and min. transmission | 0.275 and 0.170 |
| Refinement method | Full-matrix least-squares on F$^2$ |
| Data/restraints/parameters | 239/0/31 |
| Goodness-of-fit on F$^2$ | 1.34 |
| Final R indices [I > 2σ(I)] | $R_1$ = 0.027, $wR_2$ = 0.068 |
| R indices (all data) | $R_2$ = 0.029, $wR_2$ = 0.069 |
| Largest diff. peak and hole | 0.29 and −0.33 e Å$^{-3}$ |

Single crystal X-ray structure data and refinement conditions for AlFFIVEH$_2$O-1-Ni rehydrated are presented below in Table 3:

| | |
|---|---|
| Empirical formula | $C_8H_{10}AlF_5N_4NiO$ |
| Formula Weight | 358.89 |
| Temperature | 296 K |
| Wavelength | 1.54178 Å |
| Crystal system, space group | Tetragonal I4/mcm |
| Unit cell dimension | a = 9.9385(5) Å, c = 15.4138(9) Å |
| Volume | 1522.5(2) Å$^3$ |
| Z, Calculated density | 4, 1.586 Mg m$^{-3}$ |
| Absorption coefficient | 2.940 mm$^{-7}$ |
| F(000) | 720 |
| Crystal size | 0.02 × 0.05 × 0.05 mm |
| Theta range for data collection | 5.7-65.1° |
| Limiting indices | −11 ≤ h ≤ 8, −10 ≤ k ≤ 11, −15 ≤ l ≤ 18 |
| Rejections collected/unit | 2297/376 ($R_{int}$ = 0.042) |
| Completeness to $\theta_{max}$ = 65.1° | 100.0% |
| Max. and min. transmission | 0.149 and 0.052 |
| Refinement method | Full-matrix least-squares on F$^2$ |
| Data/restraints/parameters | 376/10/34 |
| Goodness-of-fit on F$^2$ | 1.01 |
| Final R indices [I > 2σ(I)] | $R_1$ = 0.040, $wR_2$ = 0.138 |
| R indices (all data) | $R_1$ = 0.057, $wR_2$ = 0.145 |
| Largest diff. peak and hole | 0.20 and −0.42 e Å$^{-3}$ |

Single crystal X-ray structure data and refinement conditions for AlFFIVEH$_2$O-1-Ni 1.48H$_2$O 0.26CO$_2$ are presented below in Table 4:

| | |
|---|---|
| Empirical formula | $C_{8.26}H_{12.96}AlF_5N_4NiO_3$ |
| Formula weight | 397.00 |
| Temperature | 296 K |
| Wavelength | 1.54178 Å |
| Crystal system. space group | Tetragonal, P4/mmm |
| Unit cell dimensions | a = 6.9996(4) Å, c = 7.6930(5) Å |
| Volume | 376.91(5) Å$^3$ |
| Z, Calculated density | 1, 1.749 Mg m$^{-3}$ |
| Absorption coefficient | 3 137 mm$^{-1}$ |
| F(000) | 201 |
| Crystal size | 0.02 × 0.05 × 0.05 mm |
| Theta range for data collection | 5.8-66.0° |
| Limiting indices | −8 ≤ h ≤ 8, −7 ≤ k ≤ 8, −8 ≤ l ≤ 8 |
| Reflections collected/unique | 3712/229 ($R_{int}$ = 0.022) |
| Completeness to $\theta_{max}$ = 66.0° | 97.4% |
| Max. and min. transmission | 0.156 and 0.055 |
| Refinement method | Full-matrix least-squares on F$^2$ |
| Data/restraints/parameters | 229/13/44 |
| Goodness-of-fit on F$^2$ | 1.19 |
| Final R indices [I > 2σ(I)] | $R_1$ = 0.044, $wR_2$ = 0.127 |
| R indices (alt data) | $R_1$ = 0.044, $wR_2$ = 0.127 |
| Largest diff. peak and hole | 0.37 and −022 e Å$^{-3}$ |

Single crystal X-ray structure data and refinement conditions for FeFFIVEH$_2$O-1-Ni are presented below in Table 5:

| | |
|---|---|
| Empirical formula | $C_8H_{18}F_5N_4NiO_3$ |
| Formula weight | 459.82 |
| Temperature | 296 K |
| Wavelength | 1.54178 Å |
| Crystal system, space group | Tetragonal, P4/nbm |
| Unit cell dimensions | a = 9.892(1) Å, c = 7.971(1) Å |
| volume | 780.0(2) Å$^3$ |
| Z, Calculated density | 2, 1.958 Mg m$^{-3}$ |
| Absorption coefficient | 9.79 mm$^{-1}$ |
| F(000) | 466 |
| Crystal size | 0.03 × 0.02 × 0.02 mm |
| Theta range for data collection | 5.6-67.9 |
| Limiting indices | −11 ≤ h ≤ 9, −11 ≤ k ≤ 11, −9 ≤ l ≤ 9 |
| Reflections collected/unique | 5846/384 ($R_{int}$ = 0.036) |
| Completeness to theta = 67.0° | 99.2% |
| Max. and min. transmission | 0.753 and 0.632 |
| Refinement method | Full-matrix least-squares on F$^2$ |
| Data/restraints/parameters | 384/0/36 |
| Goodness-of-fit on F$^2$ | 1.02 |
| Final R indices [I > 2σ(I)] | $R_1$ = 0.025, $wR_2$ = 0.069 |
| R indices (alt data) | $R_1$ = 0.027, $wR_2$ = 0.071 |
| Largest diff. peak and hole | 0.28 and −0.46 e Å$^{-3}$ |

Figure 6A:
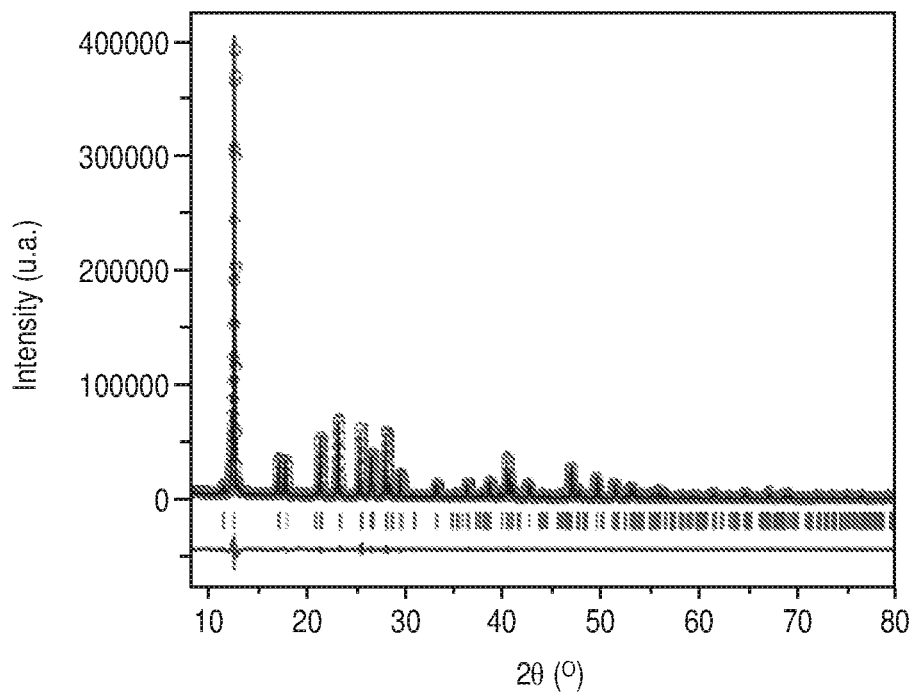
FIGS. 6A-B are final Le Bail profile refinement with observed (black line), calculated (red point), and difference (blue line) profiles of X-ray of diffraction data, vertical green bars are related to the calculated Bragg reflection positions, where A) AlFFIVEH$_2$O-1-Ni ($R_p$=0.086, $R_{wp}$=0.108, $R_{exp}$=0.022, $x^2$=23.1) and B) FeFFIVEH$_2$O-1-Ni ($R_p$=0.110, $R_{wp}$=0.085, $R_{exp}$=0.048, $x^2$=3.11), according to one or more embodiments of the present disclosure.
Figure 6B:
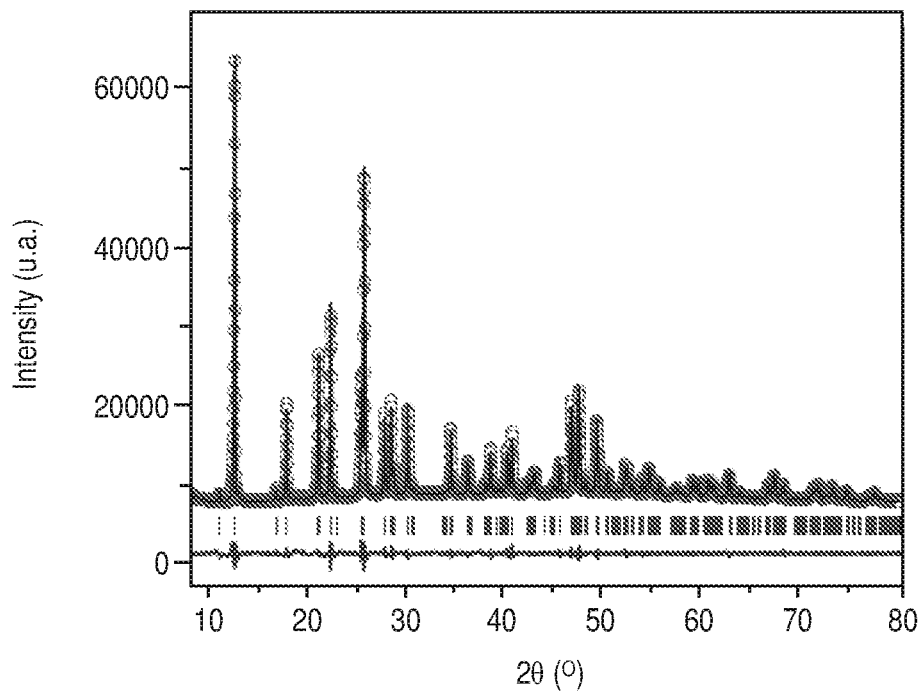

Le Bail refinements of the powder X-ray diffraction (PXRD) patterns for the as-synthesized materials were carried out for full profile fitting against the resultant structure from SCXRD, displaying a good agreement factor (unweight-profile R factor ($R_p$) and weighted-profile R factor ($R_{wp}$) for AlFFIVE-1-Ni and FeFFIVE-1-Ni are $R_p$=0.086, $R_{wp}$=0.108 and $R_p$=0.110, $R_{wp}$=0.085, respectively), and confirming the phase purity of the as-synthesized fluorinated MOFs (FIGS. 6A-B).

Structural analysis of the two crystal structures, AlFFIVEH$_2$O-1-Ni and FeFFIVEH$_2$O-1-Ni, revealed the presence of $[AlF_5(H_2O)]^{2-}$ and $[FeF_5(H_2O)]^{2-}$ inorganic building block as pillars within the associated fluorinated MOF. The coordinated water molecule and the three axial fluorine atoms comprised in the pillar, and pointing into the one dimensional channel, were disordered over four positions and not crystallographically distinguishable.

Figure 5I:
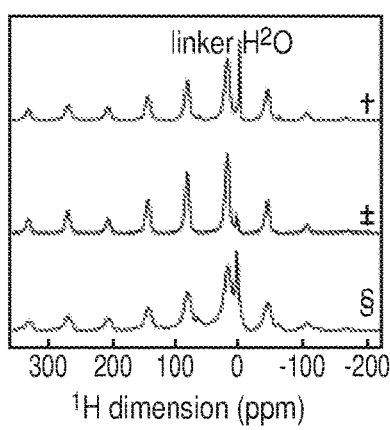
Figure 8A:
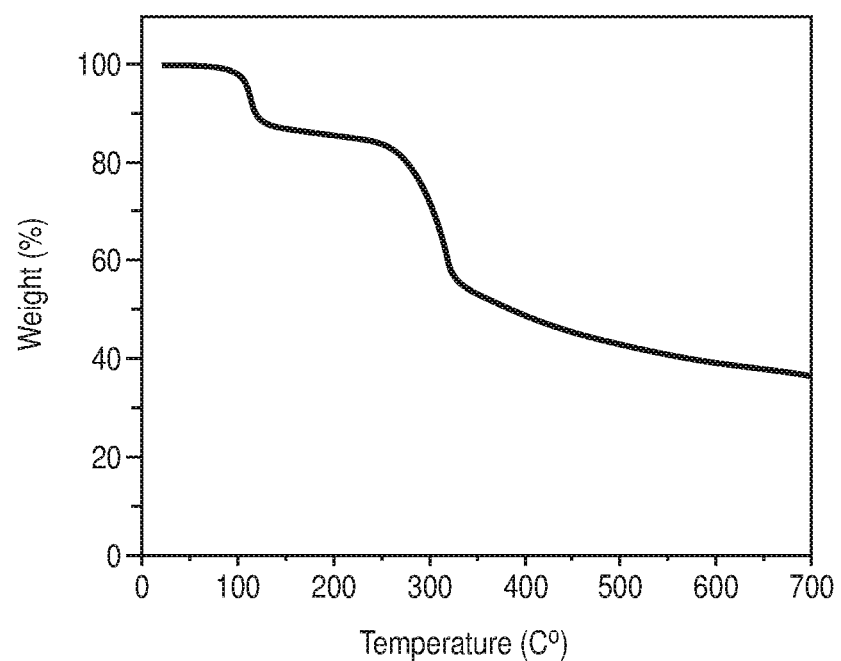
FIGS. 8A-C are TGA plots for A) as synthesized AlFFIVEH$_2$O-1-Ni, B) rehydrated AlFFIVEH$_2$O-1-Ni, and C) FeFFIVEH$_2$O-1-Ni, according to one or more embodiments of the present disclosure.
Figure 8B:
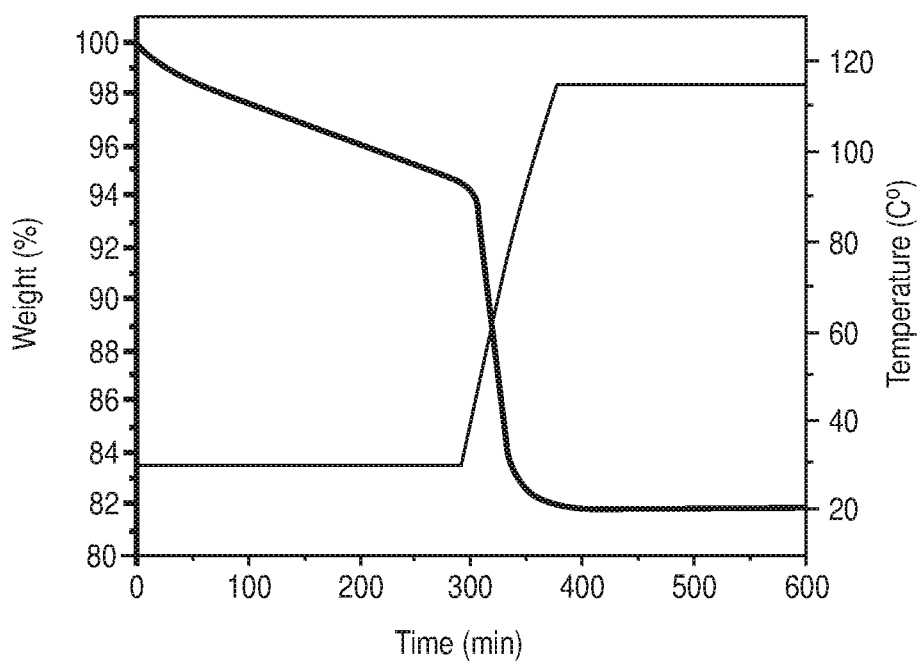
Figure 8C:
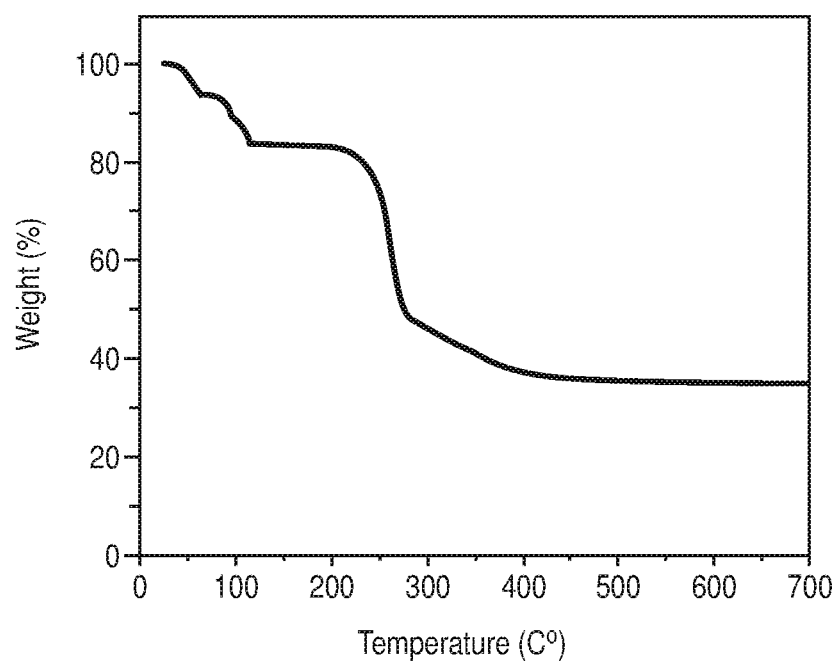
Figure 10A:
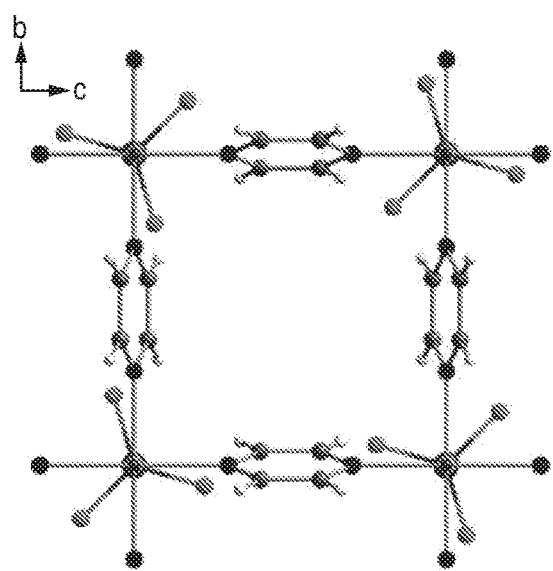
FIGS. 10A-B are projections along [001] and [101], according to one or more embodiments of the present disclosure. In particular, FIGS. A) and B) projection along [001] and [010] of dehydrated AlFFIVEH$_2$O-1-Ni crystal structure.
Figure 10B:
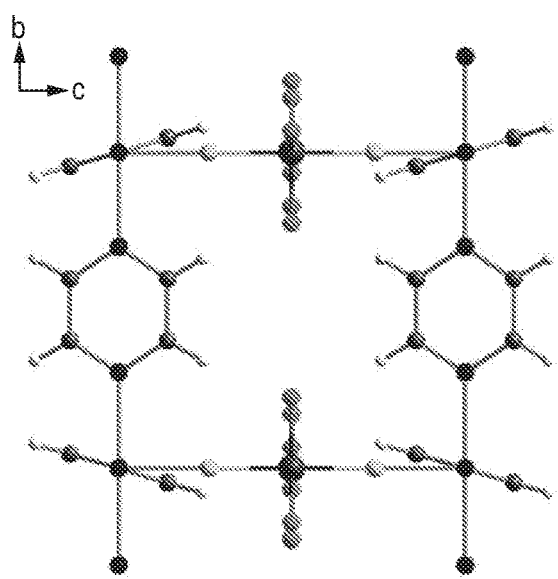
Figure 26:
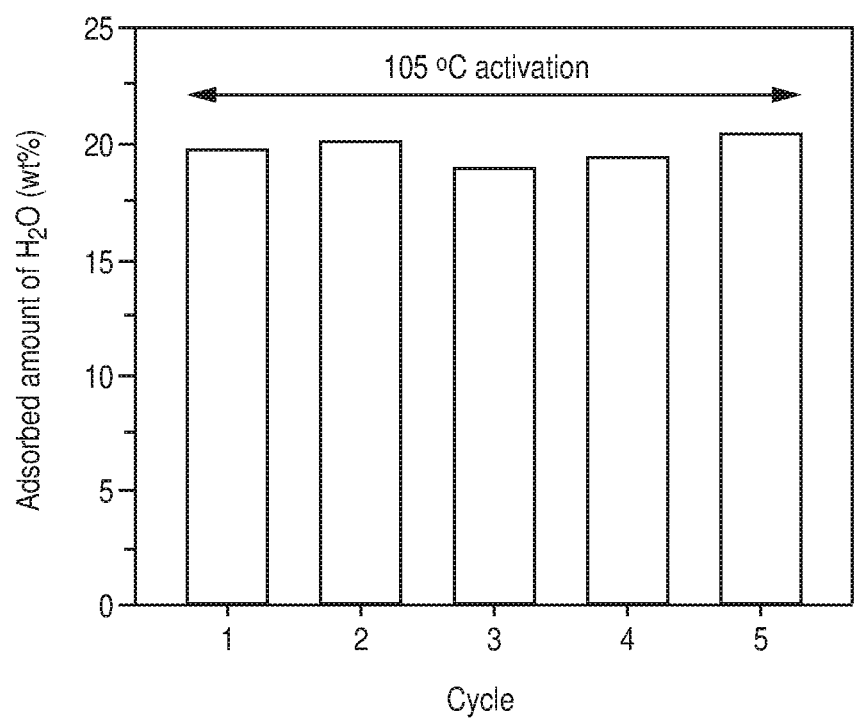
FIG. 26 is a graphical view of multiple cycles adsorption column breakthrough test for AlFFIVEH$_2$O-1-Ni with hydrated CO$_2$/CH$_4$: 1/99 gas mixture (after 30 min activation at 105° C.) evidencing the unaltered performance, according to one or more embodiments of the present disclosure.

The available free volume within the channels was occupied by extra non-coordinated water molecules, as evidenced by the noted electron density distribution along the channels and supported by thermogravimetric analysis (FIGS. 8A-C) and $^1$H MAS NMR results (FIG. 5I†). For AlFFIVEH$_2$O-1-Ni, the TGA plot showed that the as-synthesized sample lost solvent rapidly around 100° C., with a plateau observed from 100-220° C. The weight loss of 15% between 20° C. and 220° C. corresponded to a loss of three water molecules (calc. 13.7 wt %); the two guests and the one from the open metal site. Above 260° C., AlFFIVEH$_2$O-1-Ni started to decompose (FIG. 8A). To evaluate the temperature of re-activation, i.e. a second process of emptying pores, a TGA was carried out. The sample was heated to 105° C. for 1 hour and then exposed to liquid water. After a drying process (overnight at room temperature), the TGA plot showed a weight loss of about 18.2% between about 30° C. and about 115° C. that corresponded to a loss of five water molecules (calc. 20.9 wt %), which was in a good agreement with values obtained from cyclic water adsorption (FIG. 26). The TGA plot of FeFFIVEH$_2$O-1-Ni showed a weight loss of about 17.7% between about 20 and about 215° C. It corresponded to the five water molecules (calc. 19.6 wt %). Above 230° C. FeFFIVEH$_2$O-1-Ni started to decompose rapidly (FIG. 8C). Remarkably, two crystallographic independent water molecules were present within the cavities of AlFFIVEH$_2$O-1-Ni while four water molecules can be distinguished in the case of FeFFIVEH$_2$O-1-Ni. A hydrogen bonding network between fluorine atoms of pillars and water guest molecules was observed in both cases with distinct differences that are depicted and detailed in FIGS. 5A-J and FIGS. 9A-D. In AlFFIVEH$_2$O-1-Ni, the symmetrically generated water molecules were interconnected by hydrogen bonding to each other and further connected to fluorine atoms belonging to pillars (FIG. 5B and FIGS. 9A, 9B). Whereas in the case of FeFFIVEH$_2$O-1-Ni, four water molecules constituted a tetrahedral-shaped arrangement that was further sustained by additional hydrogen bonding interactions from the coordinated water and the fluorine moieties (FIGS. 9C, 9D). FIGS. 10A-B are projections along [001] and [101], according to one or more embodiments of the present disclosure. In particular, FIGS. A) and B) projection along [001] and [010] of dehydrated AlFFIVEH$_2$O-1-Ni crystal structure.

Figure 11A:
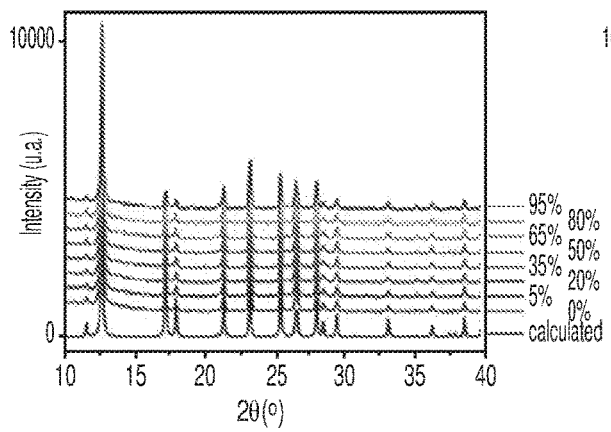
FIGS. 11A-F are graphical views of the stability and water sorption properties of MFFIVEH$_2$O-1-Ni, according to one or more embodiments of the present disclosure. A) Variable humidity PXRD patterns for AlFFIVEH$_2$O-1-Ni. B) Variable humidity PXRD patterns for FeFFIVEH$_2$O-1-Ni. C) Water adsorption isotherm for AlFFIVEH$_2$O-1-Ni at 308K. D) Water adsorption isotherm for FeFFIVEH$_2$O-1-Ni at 308K. E) Comparison and relationship between water uptake at 0.05 P/P$_0$, heat of sorption and regeneration temperature of AlFFIVE-1-Ni and FeFFIVE-1-Ni with other well-known dehydrating agents. F) adsorption-desorption cycles for AlFFIVEH$_2$O-1-Ni (adsorption at 298K and desorption at 378K by flushing N$_2$).
Figure 11B:
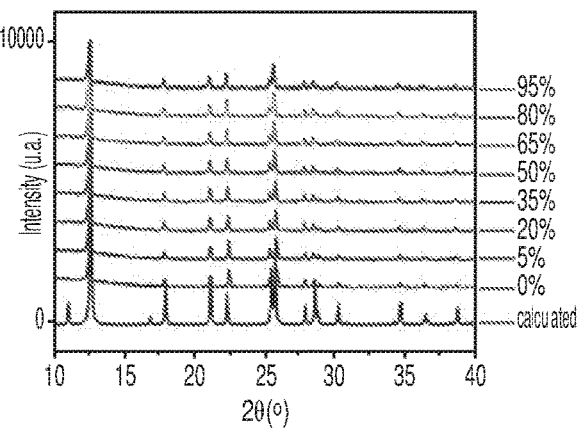
Figure 12A:
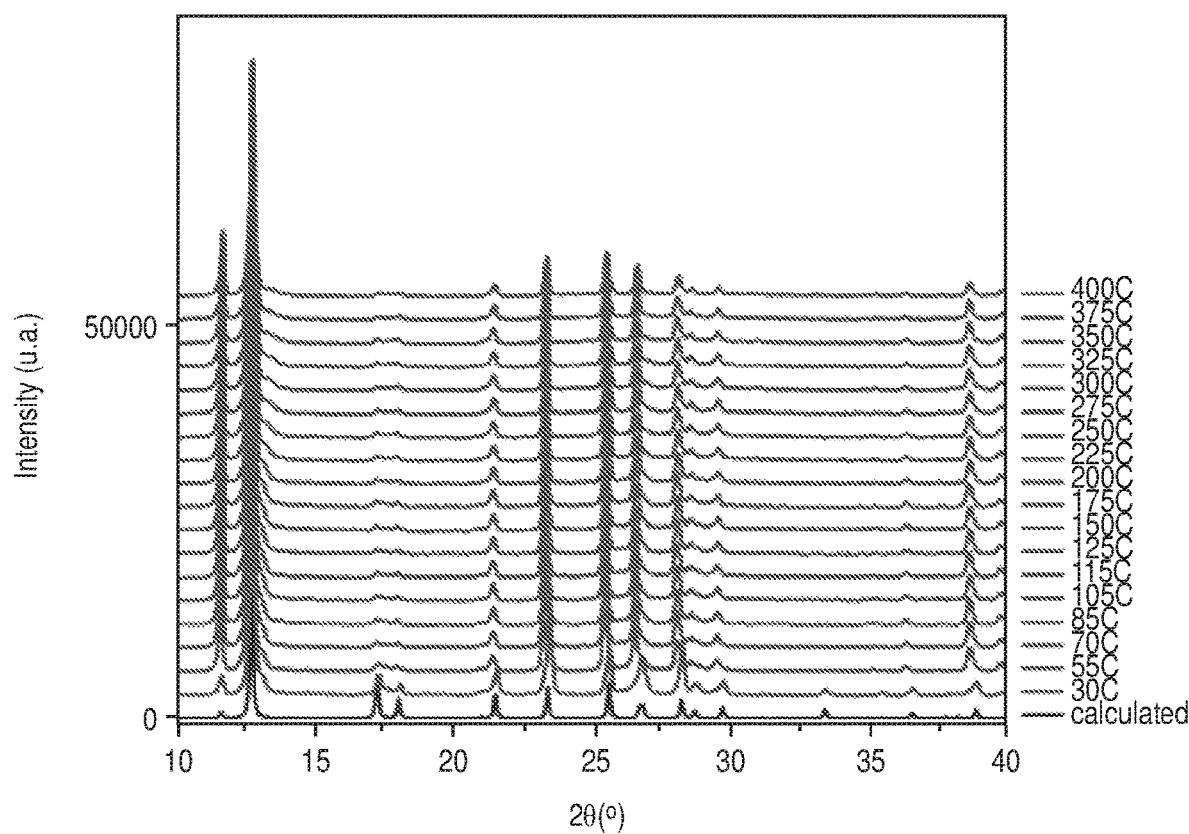
FIGS. 12A-B are variable temperature PXRD patterns for A) AlFFIVEH$_2$O-1-Ni and B) FeFFIVEH$_2$O-1-Ni, according to one or more embodiments of the present disclosure.
Figure 12B:
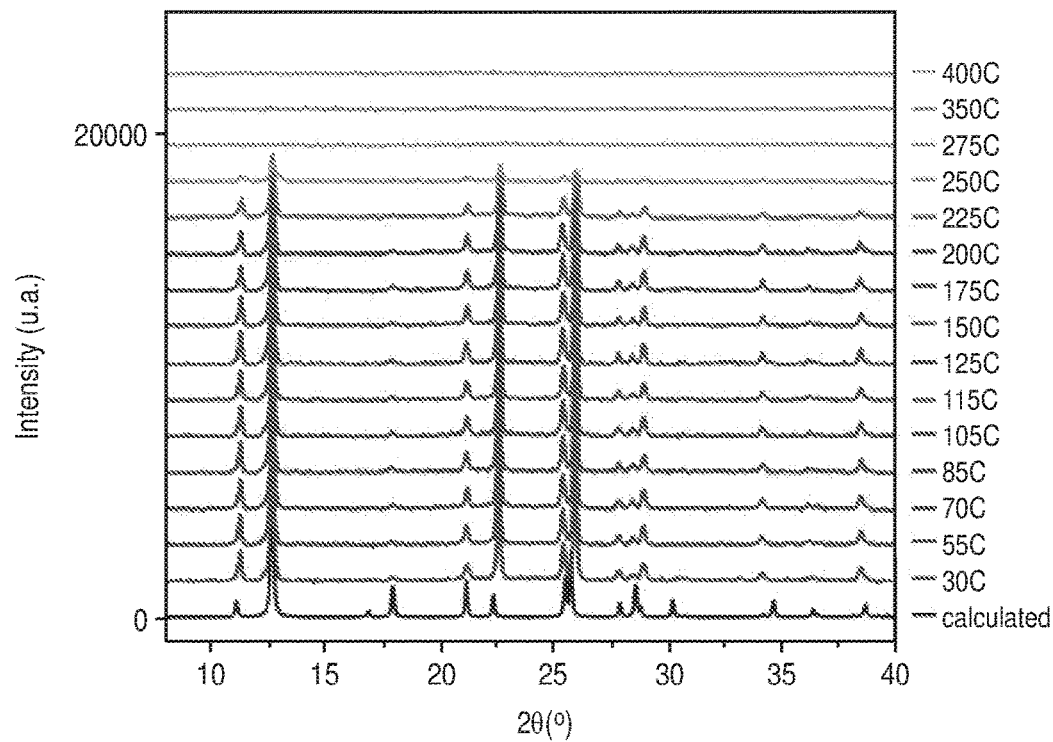

To evaluate the thermal and hydrolytic stabilities of these new fluorinated MOFs, variable humidity PXRD (VH-PXRD) (FIGS. 11A, 11B) and variable temperature PXRD (VTPXRD) measurements (FIGS. 12A-B) were performed. Markedly, the crystallinity for both AlFFIVE-1-Ni and FeF-FIVE-1-Ni was maintained up to 400° C. (673K) and 250° C. (523K) respectively, confirming their relative high thermal stability. The water stability of AlFFIVE-1-Ni and FeFFIVE-1-Ni were corroborated by similarities between theoretical PXRD patterns derived from the crystal structure and the experimental PXRD patterns collected up to 95% relative humidity (FIGS. 11A-B).

The presence of prospective open metal sites within the confined void of one dimensional channels, encompassing a periodic array of fluorine moieties, of the AlFFIVE-1-Ni and FeFFIVE-1-Ni structures, prompted a purposeful investigation and evaluation of the adsorption properties of these fluorinated materials for water against other distinct probe molecules, specifically highly polarizable molecules such as $CO_2$, n-$C_4H_{10}$ and iso-$C_4H_{10}$, and poorly polarizable molecules such $CH_4$ and $N_2$. Related materials with no open metal sites, but with the requisite confined channels hosting a periodic array of fluorine moieties showed high affinity for $CO_2$ as compared to $H_2O$.

Figure 11C:
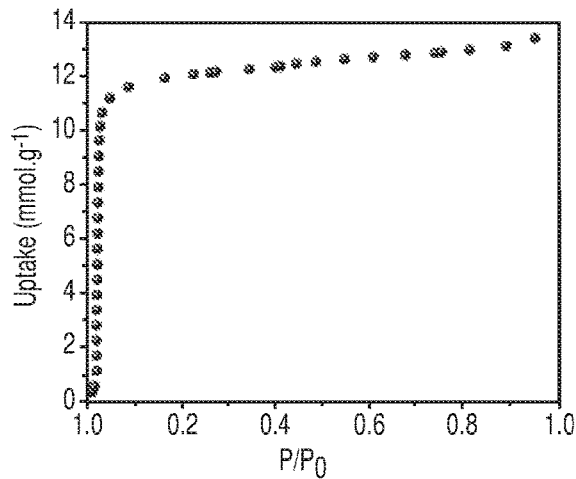
Figure 11D:
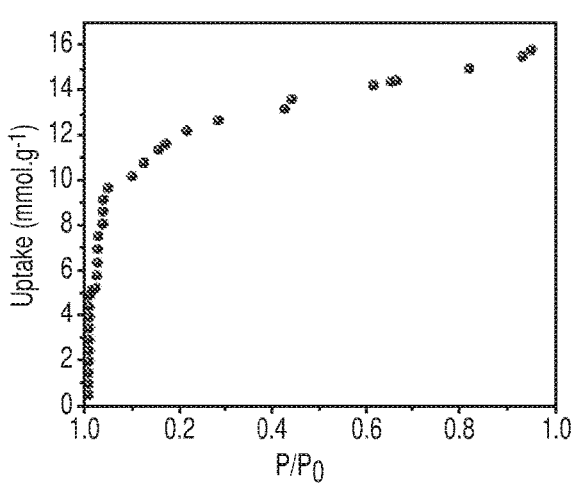
Figure 13:
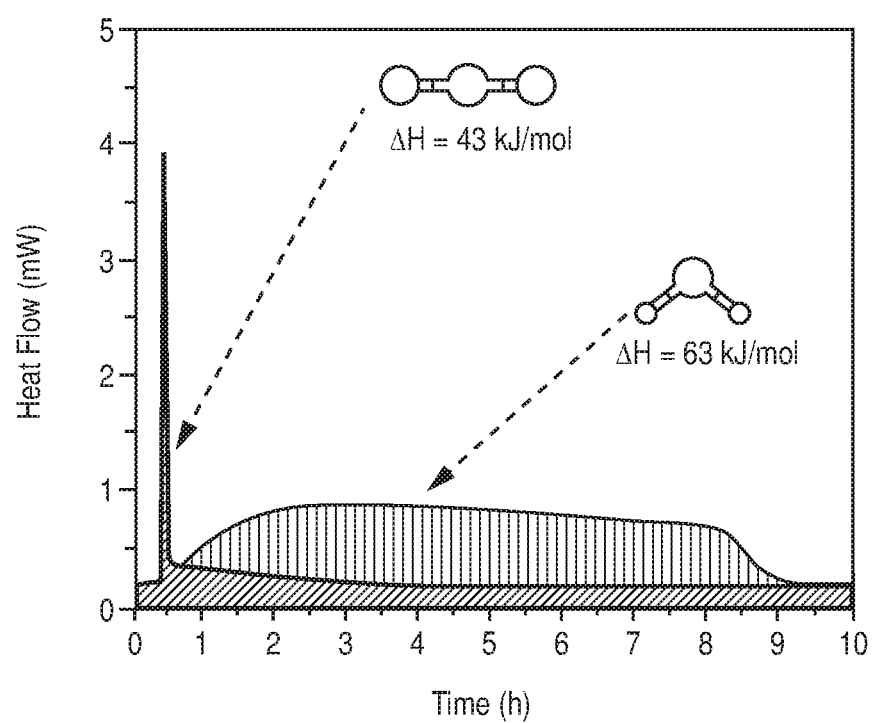
FIG. 13 is a comparison of two independent TG-DSC measurements on activated AlFFIVE-1-Ni with (1/99) CO$_2$/N$_2$ mixture and with humid N$_2$ (75% RH) at 298K, according to one or more embodiments of the present disclosure.
Figure 14:
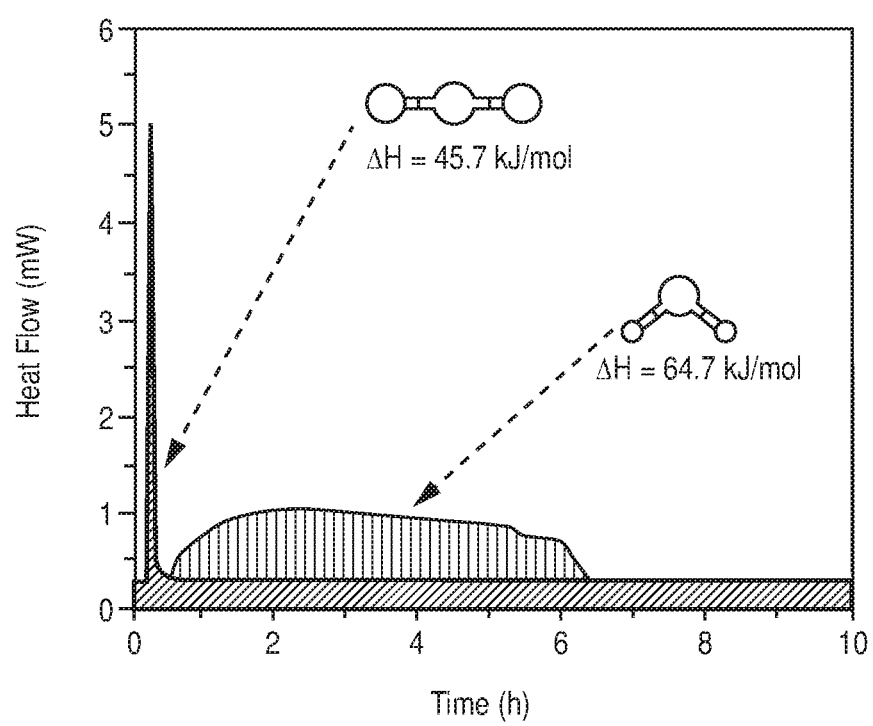
FIG. 14 is a comparison of two independent TG-DSC measurement on activated FeFFIVEH$_2$O-1-Ni with humid (75% RH) (1/99) CO$_2$/N$_2$ mixture at 25° C., according to one or more embodiments of the present disclosure.

The water adsorption isotherms for both materials and in particular for AlFFIVEH$_2$O-1- Ni displayed a remarkable adsorption isotherm steepness at very low partial pressures, indicative of these materials high affinity for water (FIGS. 11C-D). AlFFIVE-1-Ni and FeFFIVE-1-Ni showed exceptional water adsorption capacities with an associated saturation of 22 and 18 wt %, respectively, at $P/P_0$=0.05 relative pressure and 298 K. Due to this marked steepness in the water adsorption isotherms, it was challenging to quantify the heat of adsorption from variable temperature isotherms. Alternatively, TG-DSC experiments were conducted to assess the water heat of adsorption for both AlFFIVE-1-Ni and FeFFIVE-1-Ni and found to be 63 kJ/mol (FIG. 13) and 64.7 kJ/mol (FIG. 14), respectively. DFT calculations on AlFFIVEH$_2$O-1-Ni confirmed the high affinity of this solid for water with a binding energy of −74.1 kJ/mol in good agreement within the experimental finding.

Figure 11E:
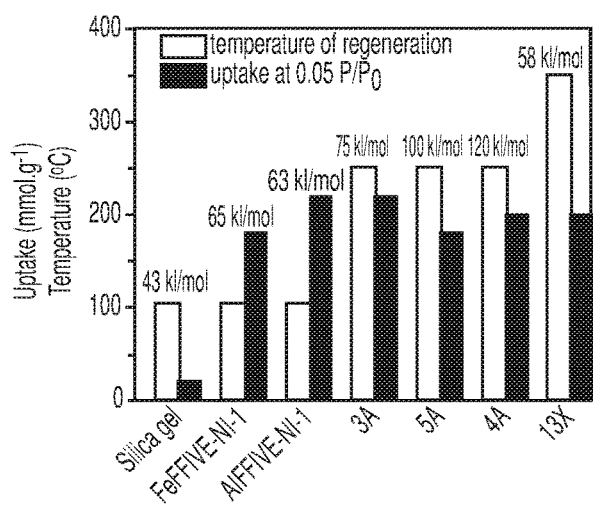
Figure 11F:
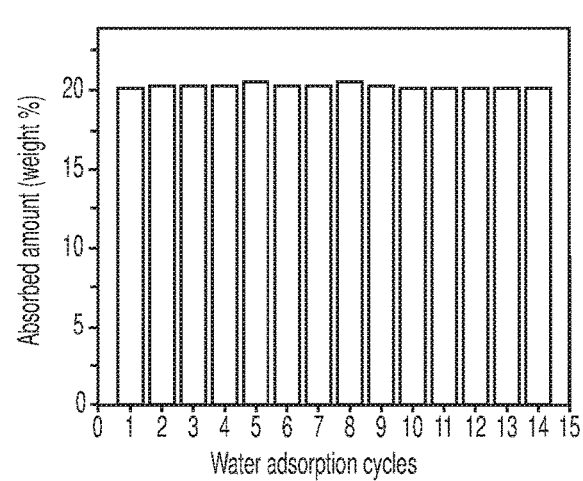
Figure 15:
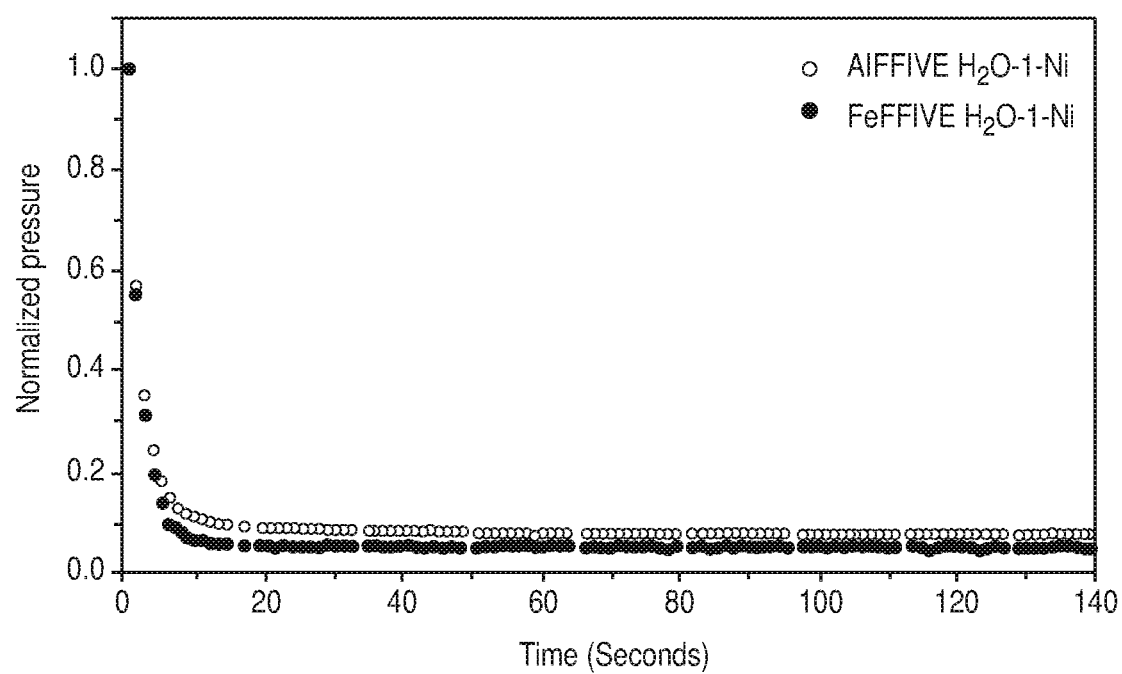
FIG. 15 is a graphical view of kinetics of H$_2$O adsorption on AlFFIVE-1-Ni and FeFFIVE-1-Ni monitored using pressure decay during adsorption isotherms collection, according to one or more embodiments of the present disclosure.
Figure 16:
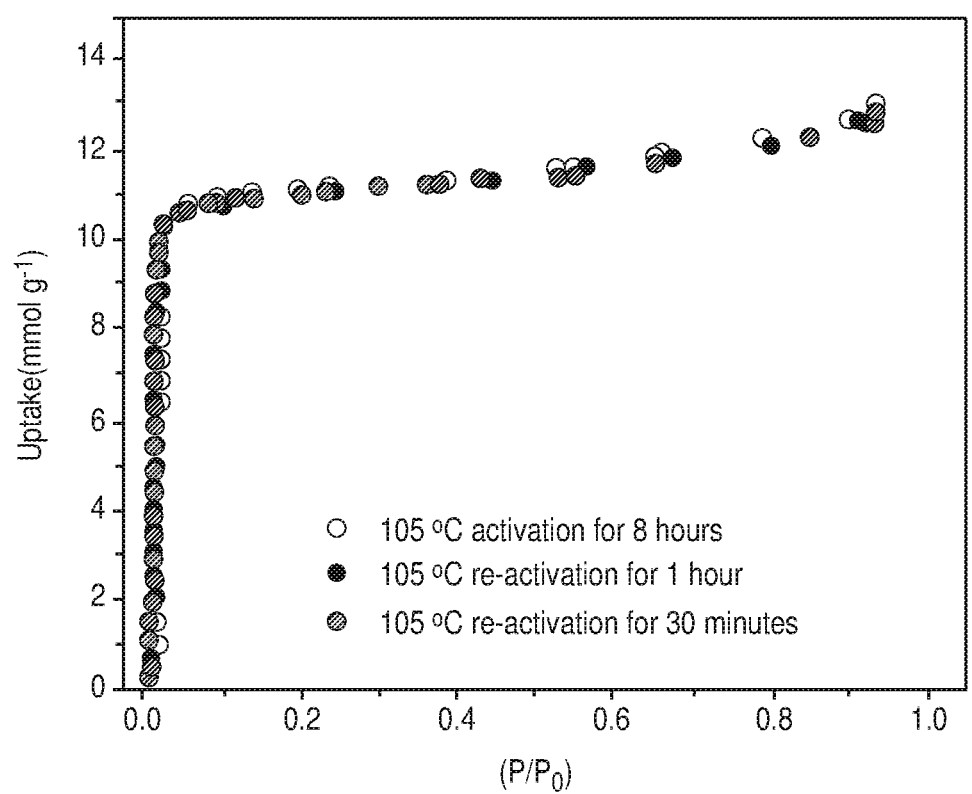
FIG. 16 is a graphical view of H$_2$O vapor adsorption performance of AlFFIVEH$_2$O-1-Ni after evacuation in vacuum at 105° C. for 30, 60 and 480 min demonstrating the fast water vapor desorption rate, according to one or more embodiments of the present disclosure.

With respect to conventional dehydrating agents, such as zeolite 3A, 4A and 5A, the heat of $H_2O$ adsorption at very low loading was markedly higher (c.a. 80-120 kJ/mol) than in the MFFIVEH$_2$O-1-Ni (M=$Al^{3+}$ or $Fe^{3+}$) adsorbents. The observed high adsorption energetics, for the adsorbed water molecules in the zeolite 4A, entailed the need for a high desorption temperature of 250° C. (523 K) for the regeneration of the said zeolite desiccant in order to ensure optimal cyclic operations. The noted relatively lower heat of $H_2O$ adsorption in the case of the MFFIVEH$_2$O-1-Ni (M=$Al^{3+}$ or $Fe^{3+}$) adsorbents was reflected by the lessened energy demand for the $H_2O$ molecules full desorption (FIG. 11E), a critical improvement in the direction of energy-efficient cyclic operations. Certainly, adsorption/desorption cyclic properties and the activation/re-activation assessment of the AlFFIVEH$_2$O-1-Ni adsorbent revealed and asserted that the full and rapid dehydration was achievable after a simple heating at 105° C. (378 K) under vacuum or by a simple flushing with a less adsorbable gas such as $N_2$ (FIG. 11F). The relatively low temperature and fast recycling attributes were of prime importance as they precluded some of the persisting concerns commonly occurring with the use of zeolites, namely the associated coke formation, when dehydration is carried out in the presence of hydrocarbons and/or VOC at high temperatures. The silica gel desiccants, exhibiting a $H_2O$ heat of adsorption of 43-50 kJ/mol, could be recycled by heating at only 90-100° C. but it had a major drawback as it only had nominal $H_2O$ adsorption uptake at relatively low $H_2O$ vapor partial pressures as shown in FIG. 11E. Similar to zeolite molecular sieves (zeolite 3A, 4A and 5A), MFFIVEH$_2$O-1-Ni exhibited an excellent rate of $H_2O$ adsorption (FIGS. 11C-D) and largely improved adsorption kinetics (FIG. 15) than other types of desiccants. AlFFIVEH$_2$O-1-Ni showed the same water vapor adsorption performance after evacuation in vacuum at 105° C. for 180, 60 and 30 min demonstrating the fast water vapor desorption rate (FIG. 16). Adsorption (at 25° C.)-desorption (at 105° C.) cycles, using temperature swing regeneration mode (TSRM) were carried out to evaluate and confirm AlFFIVEH$_2$O-1-Ni recyclability (FIG. 11F). The preserved performance, expressed by the steady H$_2$O uptake for all performed cycles, was indicative of the stable performance and the hydrolytic stability of this material.

Figure 5J:
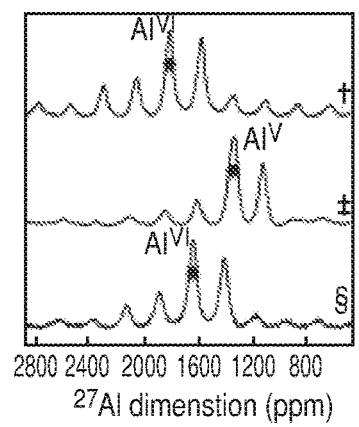
Figure 17:
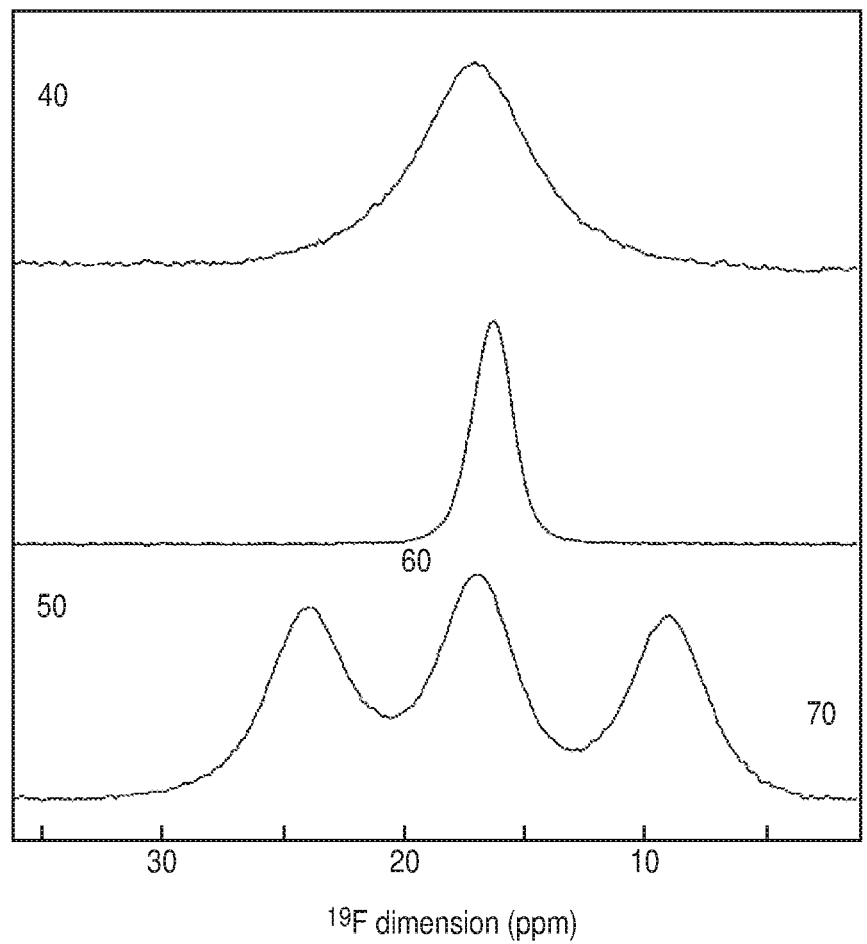
FIG. 17 is a graphical view of solid-state NMR, according to one or more embodiments of the present disclosure. In particular.

A microscopic picture of the dehydration process was depicted from the analysis of the DFT-geometry optimized structures of AlFFIVEH$_2$O-1-Ni obtained by sequentially removing 1 H$_2$O per formula unit. FIG. 5E shows that the simulated arrangement of water in the fully hydrated material is in excellent agreement with the SCXRD data with one water coordinated to the Al site and interconnected by hydrogen bonding to the other molecules which strongly interact with fluorine atoms of pillars. This global geometry was maintained upon the removal of the first H$_2$O molecule (FIG. 5E). The scenario differed when the structure contained the last H$_2$O molecule to be desorbed. In this case, H$_2$O still interacted with fluorine atoms of pillars, however, there was a significant local relaxation of the A$^{3+}$ environment from its initial square-bipyramidal geometry towards a trigonal bipyramidal-like structure that tended to push away H$_2$O from the Al$^{3+}$ sites (FIG. 5E). This further led to a dehydrated structure with a perfect trigonal bipyramidal environment for Al$^{3+}$ that was reminiscent to the geometry previously reported for the pentafluoroaluminate dianion [AlF$_5$]$^{2-}$ complex. This dehydration process was also confirmed by the $^{19}$F and $^{27}$Al MAS NMR spectra of AlFFIVEH$_2$O-1-Ni, recorded on a sample previously dehydrated for 8 hours at 105° C. under vacuum, which showed a single $^{19}$F resonance (FIG. 17‡), much narrower than that in the as-synthesized sample (FIG. 17\), and a strong shift of the $^{27}$Al resonance (from 1808 to 1340 ppm), attributed to the creation of five-fold coordinated Al$^{3+}$ cation (FIG. 5J). This prediction strongly suggested that a structural relaxation of the host framework assisted the removal of the last water molecule thus facilitating the dehydration of this material as experimentally observed.

Figure 7:
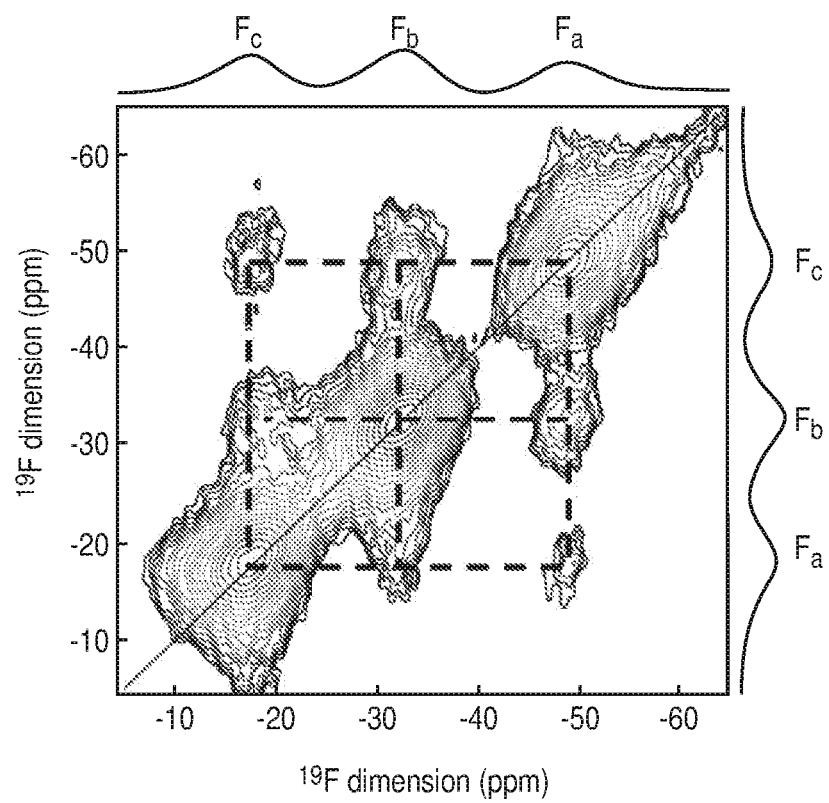
FIG. 7 is $^{19}$F-$^{19}$F 2D solid-state NMR confirming the correlation between fluorine atoms located on equatorial positions of the (AlF$_5$(H$_2$O))$^{2-}$ inorganic building block, according to one or more embodiments of the present disclosure.
Figure 18A:
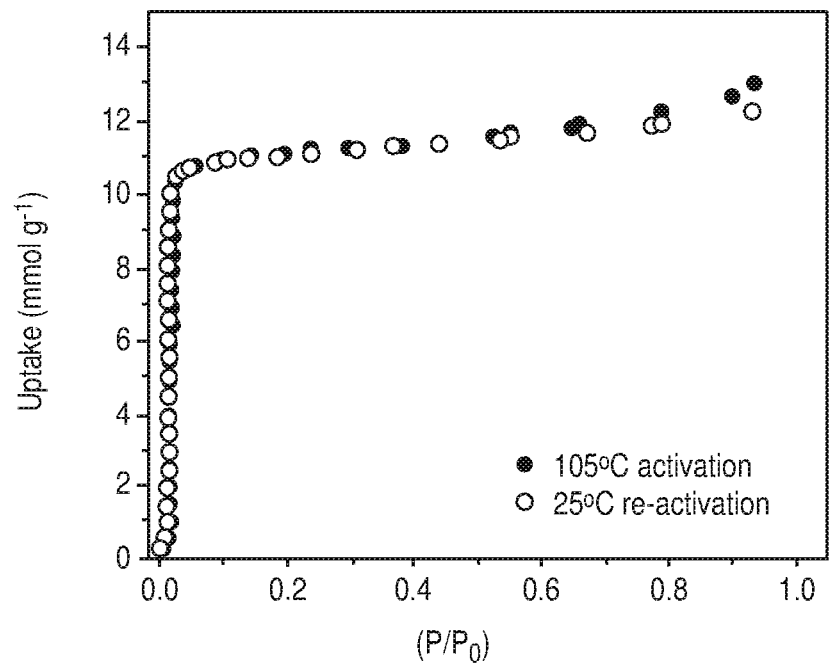
FIGS. 18A-B are graphical views of A) H$_2$O sorption for AlFFIVEH$_2$O-1-Ni after activation at 105° C. for 8 hours and re-activation at 25° C. for 8 hours, and B) H$_2$O sorption for AlFFIVEH$_2$O-1-Ni after re-activation at 105° C. for 30 min and at 25° C. for 30, 90, and 180 min, according to one or more embodiments of the present disclosure.
Figure 18B:
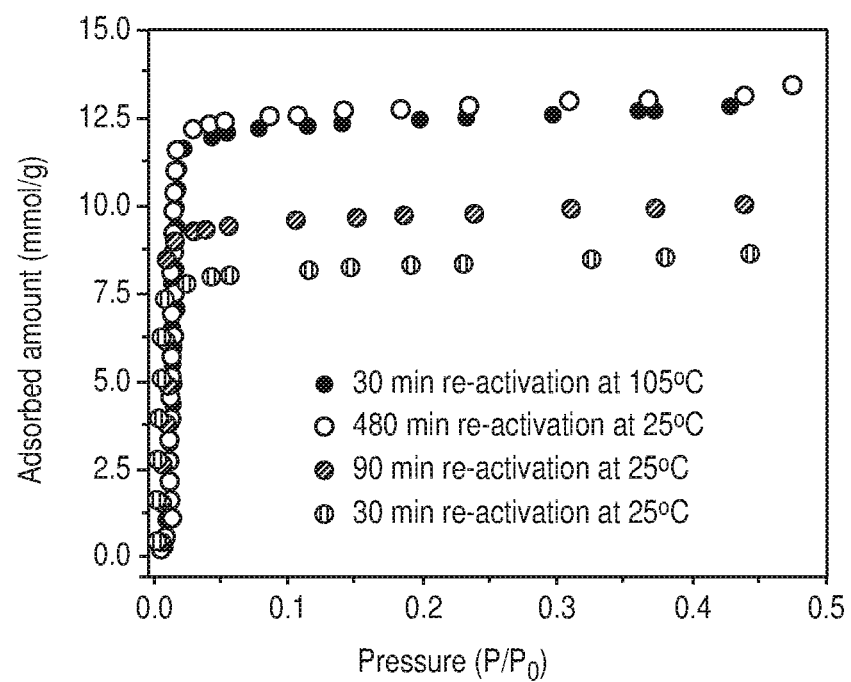
Figure 19:
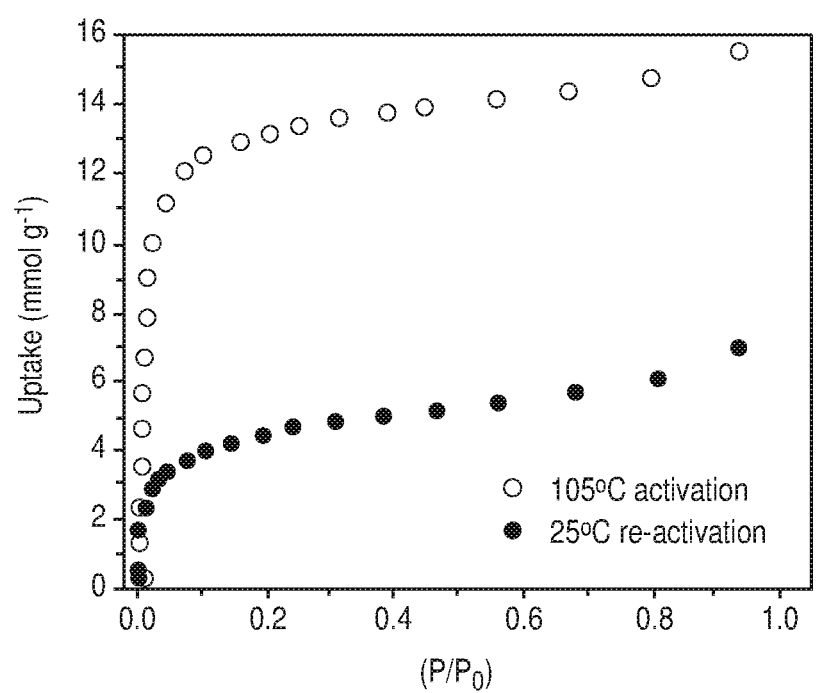
FIG. 19 is a graphical view of H$_2$O sorption for Zeolite 4A after activation at 105° C. for 8 hours and 25° C. for 8 hours, according to one or more embodiments of the present disclosure.

Rehydration allowed aluminum cations to recover their six-fold coordination state, as shown by the $^{27}$Al MAS NMR spectrum (FIG. 5J §) in which the resonance shifted to higher chemical shift (1640 ppm). In the rehydrated sample (FIG. 17§), the $^{19}$F MAS NMR spectrum contained three resonance of similar intensity, in contrast to the sharp resonance of the dehydrated sample, which confirmed that the fluorine atoms in the rehydrated form have a different environment compared to the dehydrated form. This was explained by the introduction of water molecule within the coordination sphere of Al$^{3+}$ cations. This $^{19}$F-$^{19}$F 2D NMR correlation spectrum (FIG. 7) also directly supported the presence of a relaxation mechanism as it proved that the rehydrated form contained three inequivalent fluorine atoms and one water molecule in the equatorial plane of the aluminum octahedron. Temperature of re-activation—a second process of emptying pores—of AlFFIVEH$_2$O-1-Ni, investigated using various isothermal adsorption-desorption cycles revealed that mild desorption conditions, i.e. at 298K under vacuum, was sufficient to fully remove H$_2$O from the cavities including those connected to Al$^{3+}$ cations; this re-activation condition further confirmed that the full desorption was facilitated by the theoretically predicted framework relaxation. This unprecedented mechanism provided AlFFIVEH$_2$O-1-Ni with a great advantage over other powerful solid desiccants such as Zeolite 4A (FIGS. 18A-B and FIG. 19). H$_2$O adsorption collected on 4A (FIG. 19) reference industrial desiccant, after similar re-activation at room temperature showed much lower uptake at 0.05 P/P$_0$ than AlFFIVEH$_2$O-1-Ni (19.8 wt % vs 5.4 wt % for 4A).

The unique structural features of the MFFIVEH$_2$O-1-Ni platform, periodic array of open metal coordination sites and fluorine moieties within the contracted square-shaped one-dimensional channel, associated with the unveiled remarkable water adsorption properties offer a great prospective to explore this class of materials for the selective water removal from gases and vapors. The prospect to employ MFFIVEH$_2$O-1-Ni adsorbents as effective dehydration agents was associated with the ability to selectively remove H$_2$O using equilibrium or molecular sieving based mechanisms. Therefore, the comparison between water vapor adsorption properties and the adsorption characteristics of other relevant gases and vapors, with distinct chemical/physical properties ranging from CO$_2$, CH$_4$, N$_2$ to linear and branched hydrocarbons, was fundamental to assess and confirm the potential of the MFFIVEH$_2$O-1-Ni platform as an effective and energy-efficient dehydrating agent.

Figure 20A:
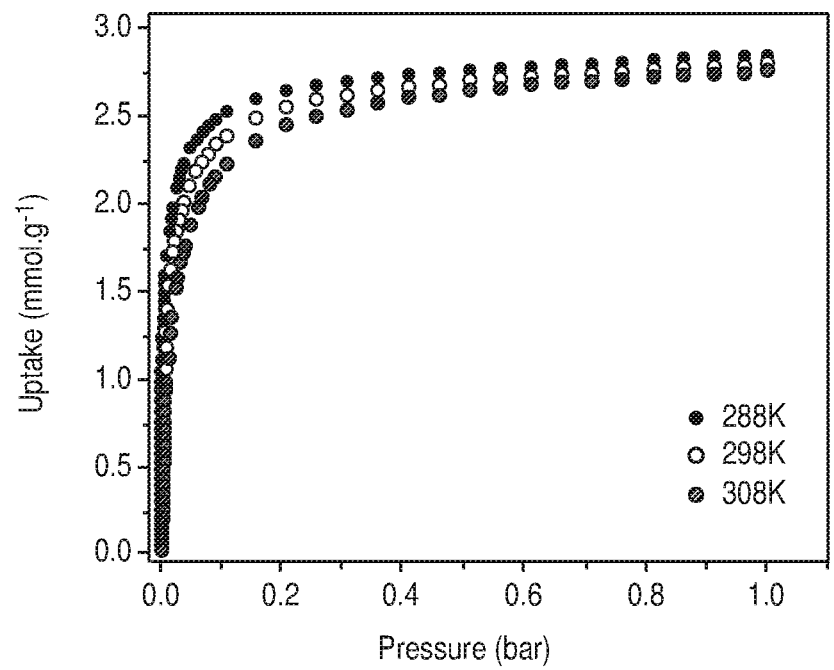
FIGS. 20A-B are A) CO$_2$ sorption isotherms at 288K, 298K and 308K of AlFFIVEH$_2$O-1-Ni, B) Q$_{st}$ of CO$_2$ adsorption calculated from the corresponding isotherms using the Clausius-Clapeyron equation, according to one or more embodiments of the present disclosure.
Figure 20B:
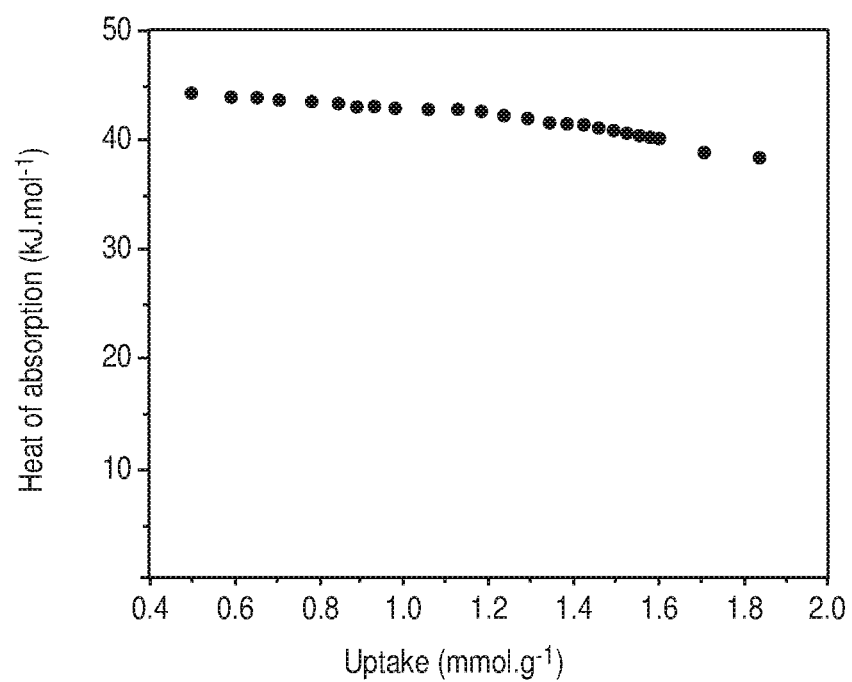
Figure 21A:
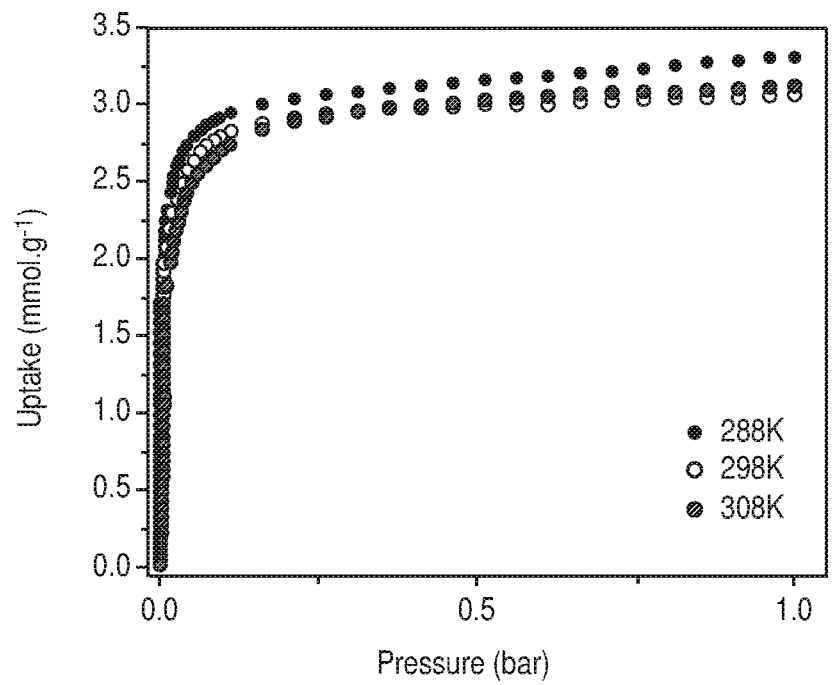
FIGS. 21A-B are A) CO$_2$ sorption isotherms at 288K, 298K and 308K of FeFFIVEH$_2$O-1-Ni, B) Q$_{st}$ of CO$_2$ adsorption calculated from the corresponding isotherms using the Clausius-Clapeyron equation, according to one or more embodiments of the present disclosure.
Figure 21B:
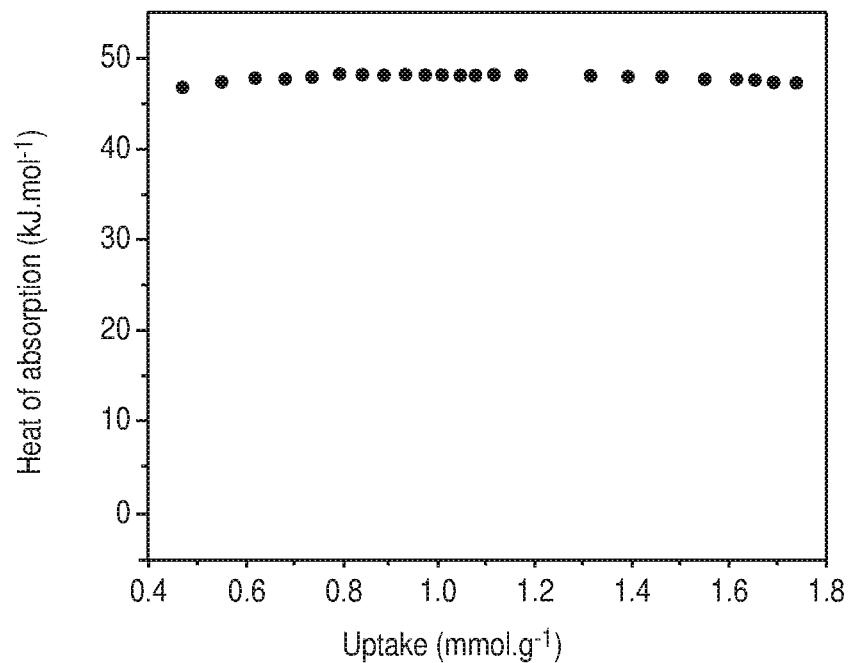
Figure 22:
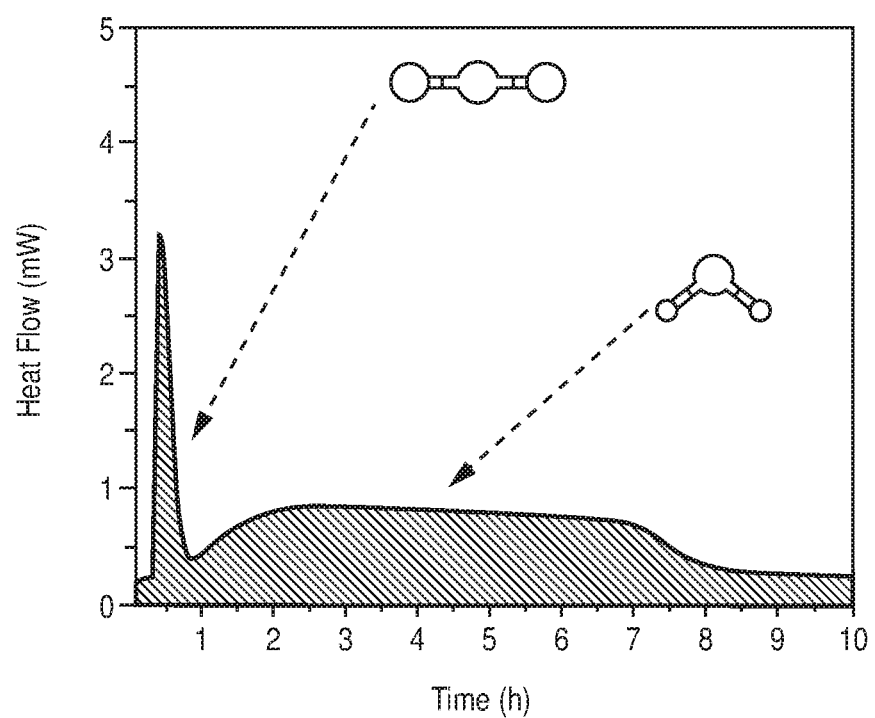
FIG. 22 is a graphical view of TG-DSC on activated AlFFIVEH$_2$O-1-Ni with humid (75% RH) (1/99) CO$_2$/N$_2$ mixture at 25° C., according to one or more embodiments of the present disclosure.
Figure 23:
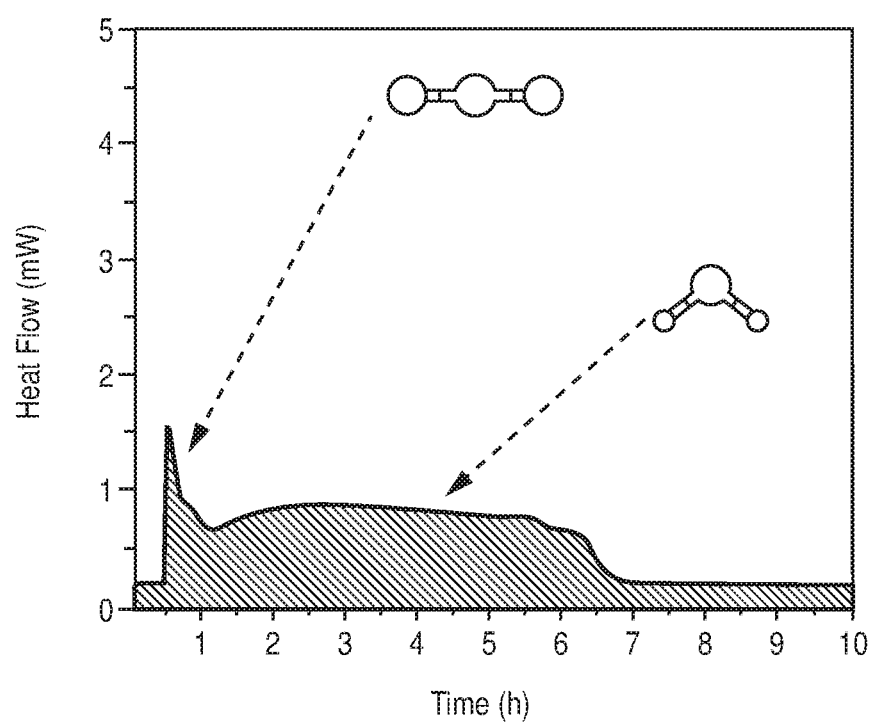
FIG. 23 is a graphical view of TG-DSC on activated FeFFIVEH$_2$O-1-Ni with humid (75% RH) (1/99) CO$_2$/N$_2$ mixture at 25° C., according to one or more embodiments of the present disclosure.
Figure 24A:
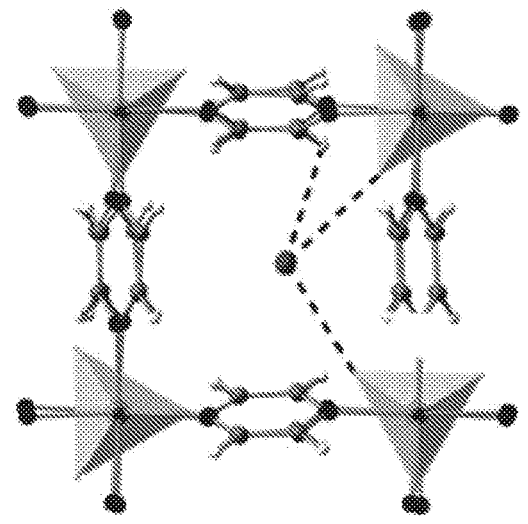
FIGS. 24A-F are schematic diagrams of AlFFIVEH$_2$O-1-Ni showing H$_2$O and CO$_2$ molecules at distinct adsorption sites, according to one or more embodiments of the present disclosure. DFT calculations performed on AlFFIVE-1-Ni showing the different adsorption sites for H$_2$O and CO$_2$: A) AlFFIVE-1-Ni containing one CO$_2$ molecule, B) AlFFIVE-1-Ni containing one H$_2$O molecule, C) AlFFIVE-1-Ni containing both H$_2$O and CO$_2$ molecules. D)-E) Projection of single-crystal structure along [001] and [010] of AlFFIVEH$_2$O-1-Ni after activation (105° C. under N$_2$ flow for 8 hours) and exposure to a mixture of CO$_2$ and H$_2$O. F) TG-DSC performed on AlFFIVE(H$_2$O)-1-Ni using CO$_2$/H$_2$O mixed gas system showing the isosteric heat of adsorption of CO$_2$ and H$_2$O when adsorbed simultaneously.

Initially, the adsorption competition between water and CO$_2$ in N$_2$, CH$_4$ and H$_2$ containing gas streams such as flue gas, natural gas, and syngas was investigated. The CO$_2$ adsorption isotherms at 298 K showed the saturation of the adsorbent pore system at a very low relative pressure (0.05 P/P$_0$) with a marked steepness, characteristic of a material with ultra-microporosity. The associated apparent surface area and the pore volume were derived from the CO$_2$ isotherms and estimated to be about 258 m$^2$/g and about 0.102 cc/g for AlFFIVEH$_2$O-1-Ni and about 324 m$^2$/g and about 0.129 cc/g for FeFFIVEH$_2$O-1-Ni. The heat of adsorption of CO$_2$, determined from variable temperature adsorption isotherms (FIGS. 20A and 21a) for AlFFIVE-1-Ni and FeFFIVE-1-Ni, was estimated to be 45±2.2 kJ/mol (FIG. 20B) and 48±2.5 kJ/mol, respectively (FIG. 21B). This was further confirmed by direct calorimetric measurements of CO$_2$ adsorption for the aluminum (43 kJ/mol) and iron (45.7 kJ/mol) analogues (FIG. 13, FIGS. 14, 22, 23) as well as by the binding energy calculated for AlFFIVEH$_2$O-1-Ni (−59.3 kJ/mol) from DFT simulations. By comparison with the Q$_{st}$ associated to H$_2$O adsorption (63 kJ/mol), it was clear that the framework-CO$_2$ interactions (45 kJ/mol) were much weaker than the framework-H$_2$O interactions (63 kJ/mol), which was mainly due to the readily available open metal sites for water coordination as mentioned above. The DFT-calculations evidenced that CO$_2$ most preferential adsorbed in a distinct site vs H$_2$O (FIG. 24A) where the electropositive carbon interacted with fluorine atoms of pillars (F . . . C$_{CO2}$=~2.8 Å) and the electronegative oxygen was surrounded by pyrazine hydrogen (H . . . O$_{CO2}$=~2.6 Å) (FIG. 24A). This geometry was reminiscent to that previously reported for NbOFFIVE-1-Ni, although the presence of open metal sites in AlFFIVEH$_2$O-1-Ni prevented CO$_2$ from interacting simultaneously with the 4 fluorine centers, thus leading to a heat of adsorption slightly lower than that for NbOFFIVE-1-Ni (~54 kJ/mol).

With the aim to study the dehydration performance of MFFIVEH$_2$O-1-Ni for the CO$_2$ containing gas streams in general and NG in particular, breakthrough adsorption column experiments were carried out on the AlFFIVEH$_2$O-1-Ni for a pure water vapor (single component) and in the presence of N$_2$, CH$_4$ and CO$_2$ adsorbates using a similar total flow of 23 cm$^3$/min and a relative humidity (RH) of 75%.

Figure 25A:
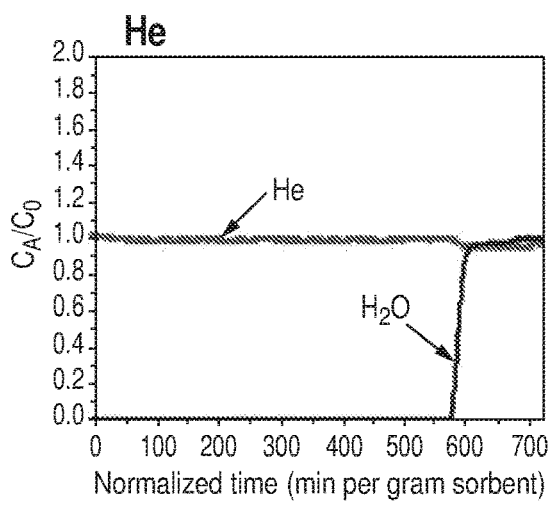
FIGS. 25A-F are graphical views of column breakthrough experiments, according to one or more embodiments of the present disclosure. A) Breakthrough test for water (75% RH) with He as a carrier gas. B) Breakthrough test for dry CO$_2$/N$_2$: 10/90 mixture. C) Breakthrough test for humid (75% RH) CO$_2$/CH$_4$: 1/99 mixture. D) Effect of CO$_2$ concentration on water breakthrough tests; humid (75% RH) CO$_2$/N$_2$: 1/99. E) Humid (75% RH) CO$_2$/N$_2$: 10/90 and F) humid (75% RH) CO$_2$/N$_2$: 50/50. It is evident that CO$_2$ concentration does not have an effect on the water breakthrough time.
Figure 25B:
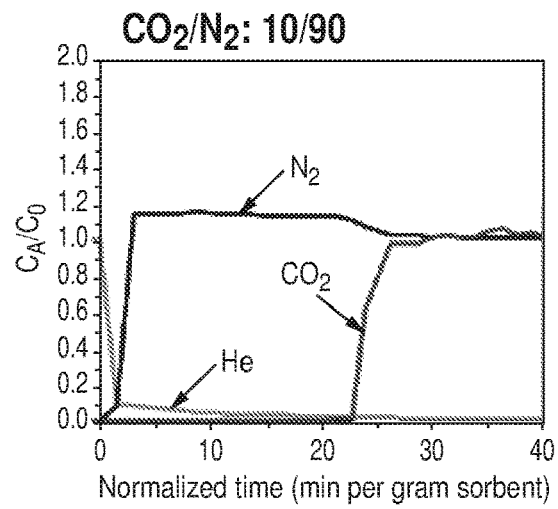
Figure 25C:
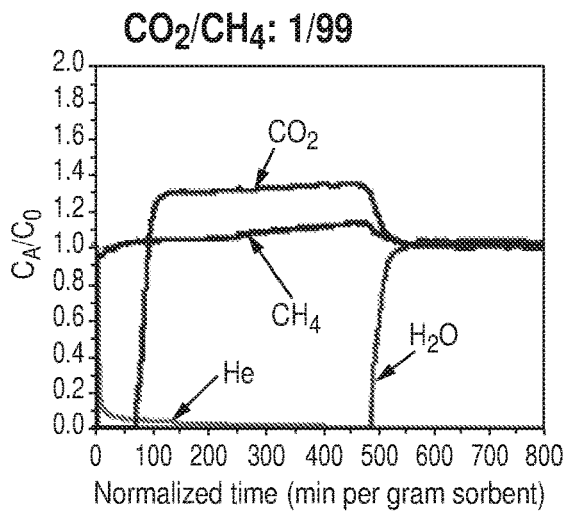
Figure 25D:
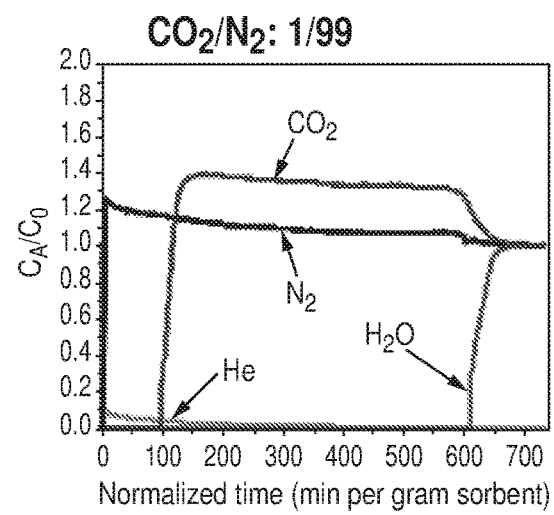
Figure 25E:
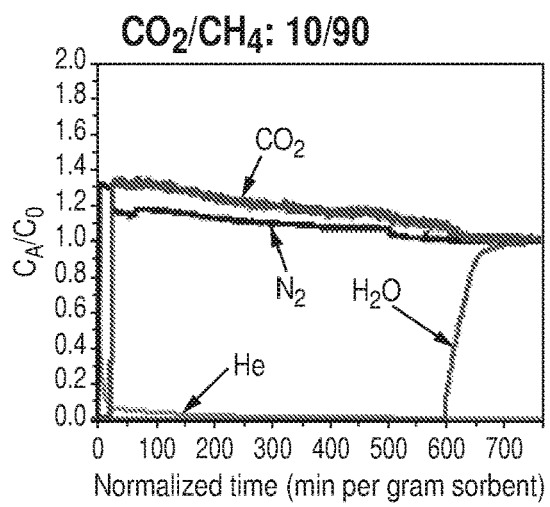
Figure 25F:
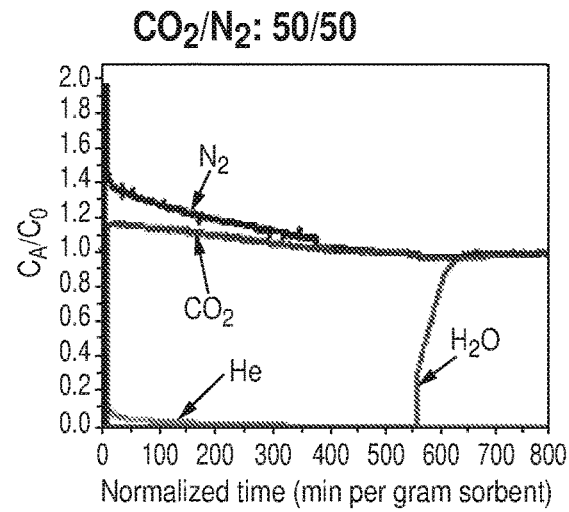
Figure 27:
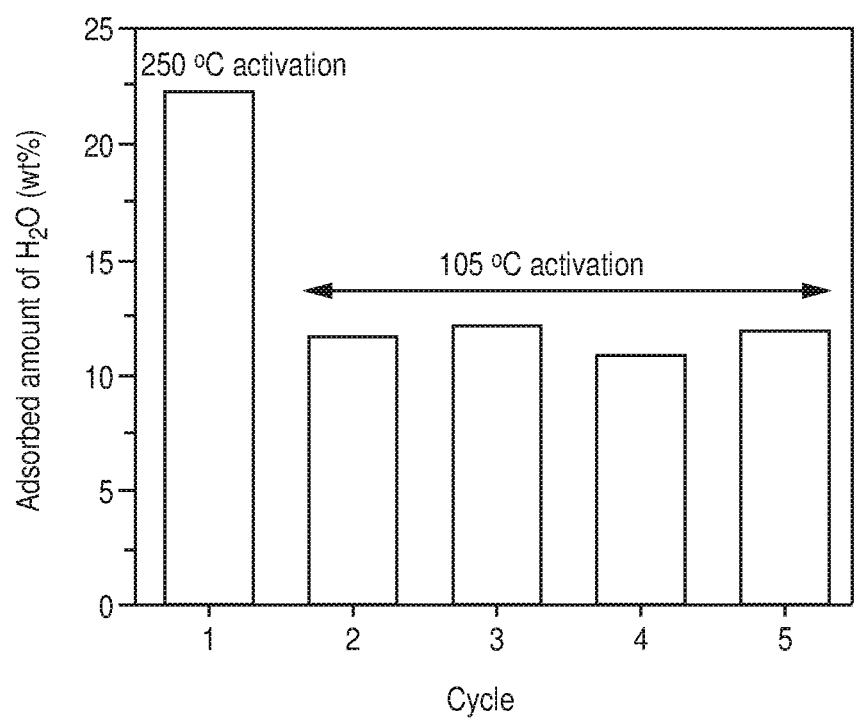
FIG. 27 is a graphical view of multiple cycles adsorption column breakthrough test for Zeolite 4A with hydrated CO$_2$/CH$_4$: 1/99 gas mixture after 30 min activation at 105° C. for cycle 2 to 5 (First cycle carried out after activation at 250° C. for 8 hours), according to one or more embodiments of the present disclosure.
Figure 28:
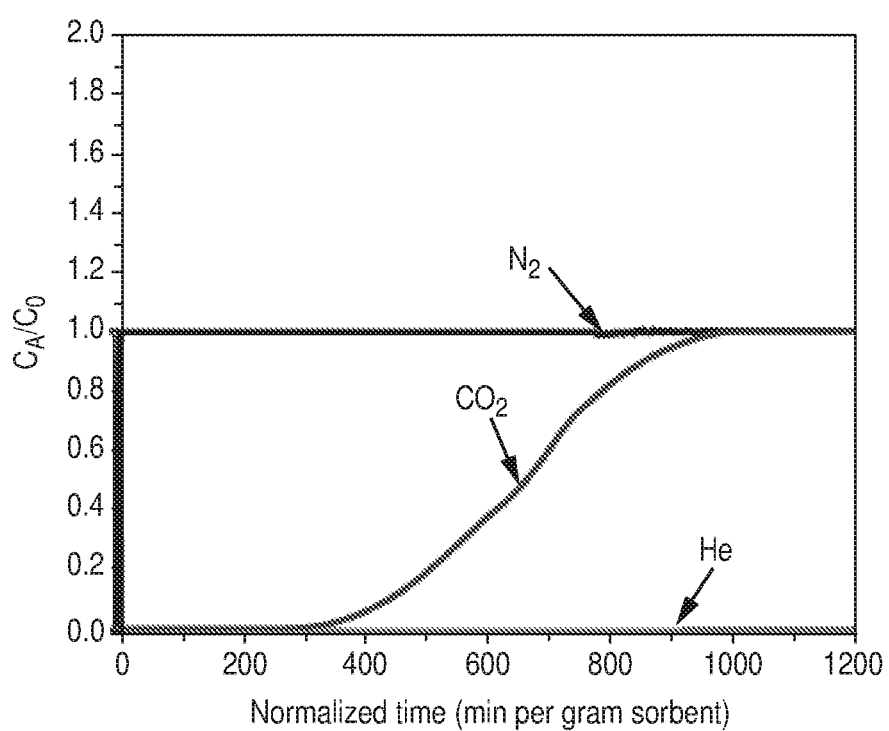
FIG. 28 is a graphical view of column breakthrough experiment of dry CO$_2$/N$_2$:10/90 at 25° C. on AlFFIVEH$_2$O-1-Ni, according to one or more embodiments of the present disclosure.
Figure 29A:
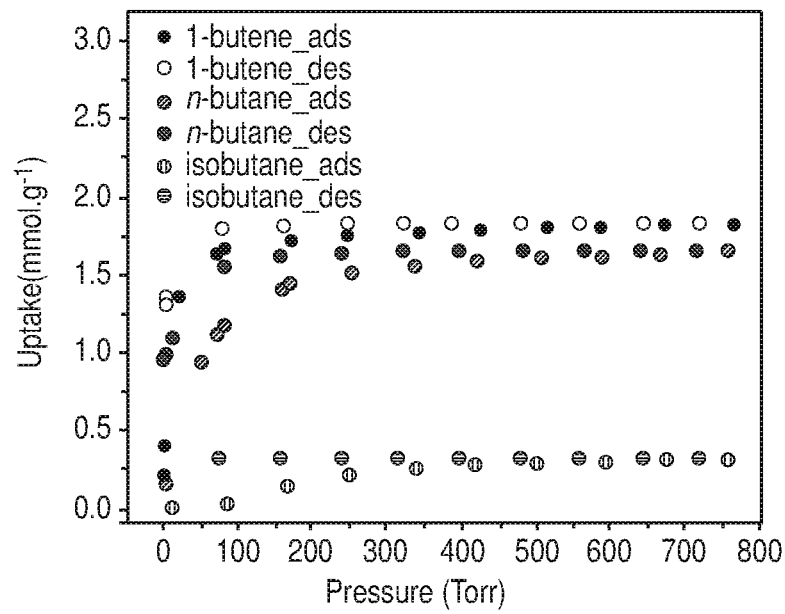
FIGS. 29A-B are graphical views of 1-butene, n-butane and i-butane sorption isotherms at 25° C. of A) AlFFIVEH$_2$O-1-Ni and B) FeFFIVEH$_2$O-1-Ni, according to one or more embodiments of the present disclosure.
Figure 29B:
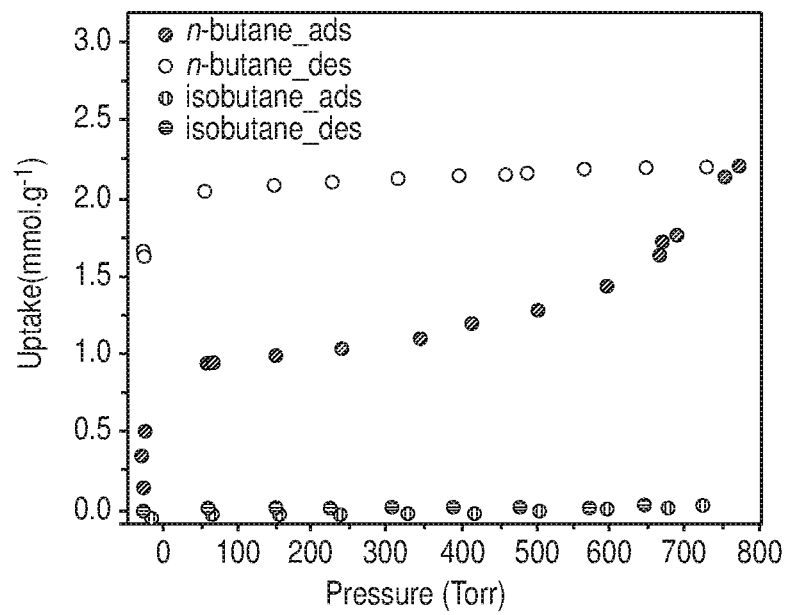
Figure 30A:
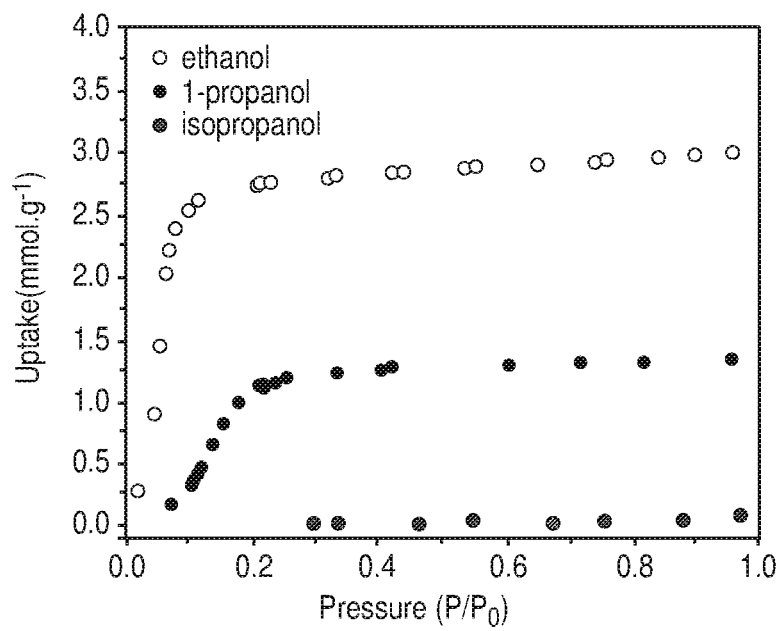
FIGS. 30A-B are graphical views of ethanol, 1-propanol and isopropanol sorption isotherms at 25° C. of A) AlFFIVEH$_2$O-1-Ni and B) FeFFIVEH$_2$O-1-Ni, according to one or more embodiments of the present disclosure.
Figure 30B:
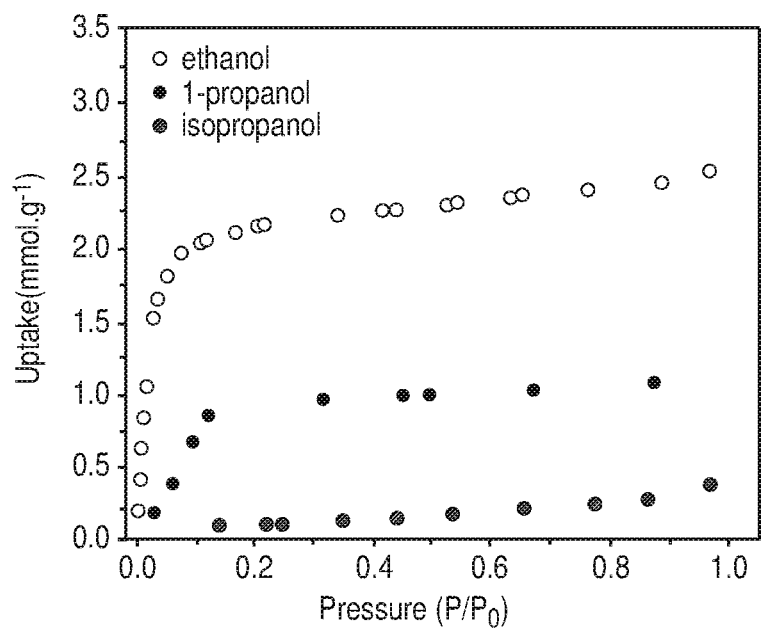

Interestingly, the H$_2$O retention times in the column were relatively similar (500-600 min/g within experimental error) and unaltered by the presence of the CH$_4$ and/or CO$_2$ in the hydrated mixed-gas CO$_2$/CH$_4$: 1/99 (FIGS. 25A, 25C). Multiple cycles adsorption column breakthrough test with hydrated CO$_2$/CH$_4$: 1/99 gas mixture evidenced the unaltered performance of AlFFIVEH$_2$O-1-Ni (FIG. 26), while a significant reduction in dehydration performance was observed for Zeolite 4A when the desorption temperature was reduced from 250° C. to 105° C. (FIG. 27). Further investigations of the $CO_2/N_2$ mixture system by increasing the $CO_2$ concentration in the said mixture to 1, 10 and 50% (FIG. 25C-E) showed no noticeable changes on the water vapor retention time in the column (500-600 min/g within experimental error). All these results supported and proved that the same water vapor adsorption behavior and uptake occurred independently of the $CO_2$ concentration and the composition of the evaluated gas mixtures (e.g. $CO_2/CH_4$: 1/99, $CO_2/N_2$: 1/99, $CO_2/N_2$: 10/90 and $CO_2/N_2$: 50/50).

On the other hand, while $CH_4$ (humid condition, FIG. 25C) and $N_2$ (in both dry and humid conditions, FIG. 25B) did not show any noticeable uptake, the retention time in the column for $CO_2$ during moisture containing tests revealed a nominal difference (within experimental error) when compared to the corresponding dry tests for all the evaluated gas mixtures. Even though the water adsorption energetics in the $AlFFIVEH_2O$-1-Ni favored the $H_2O$ adsorption, these results revealed the concomitant adsorption of the $CO_2$ molecules in the presence of water.

Figure 24B:
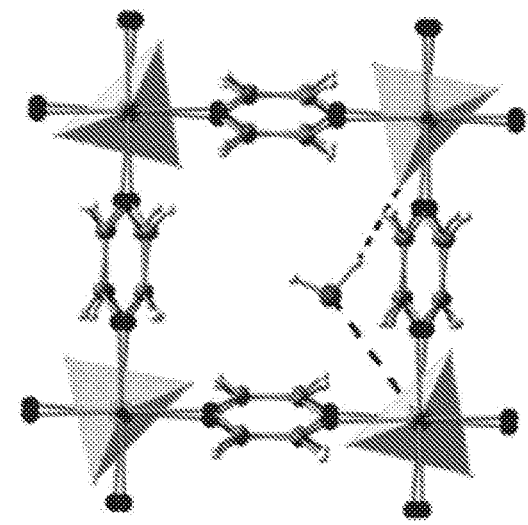
Figure 24C:
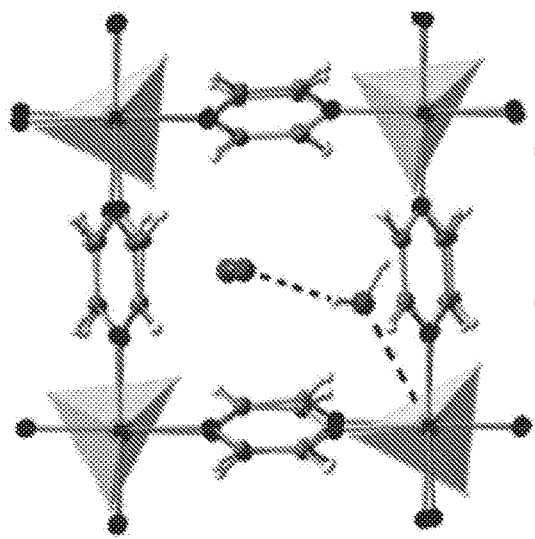
Figure 24D:
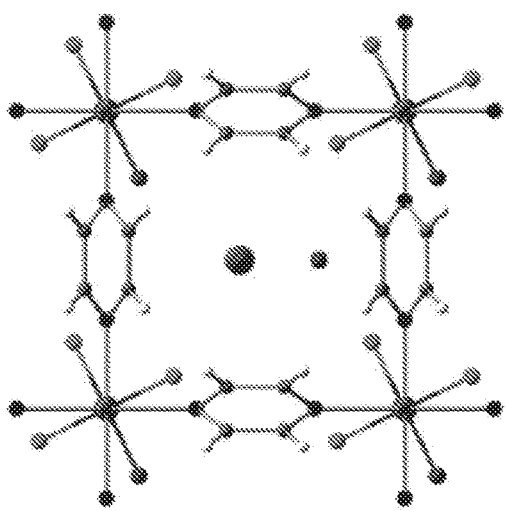
Figure 24E:
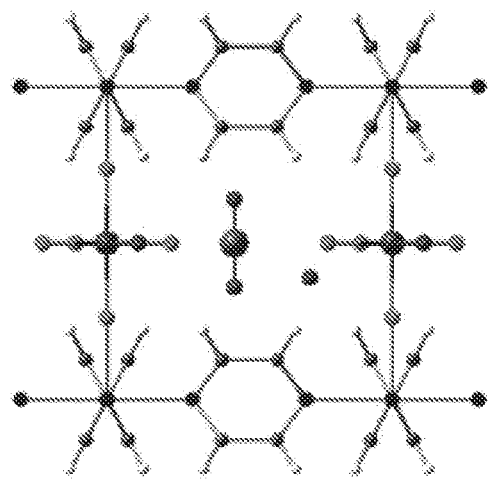
Figure 24F:
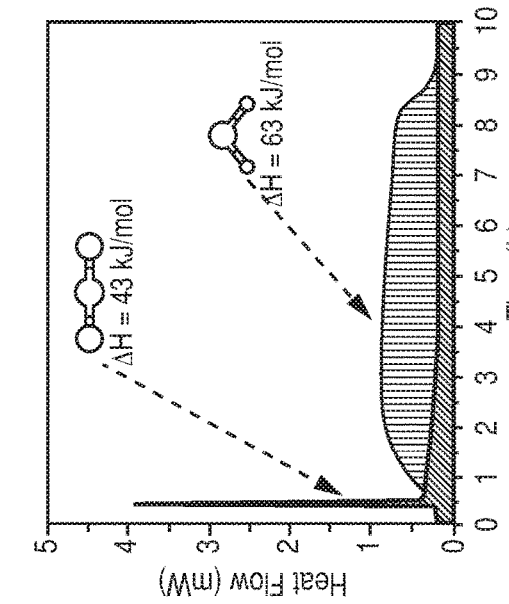
Figure 24H:
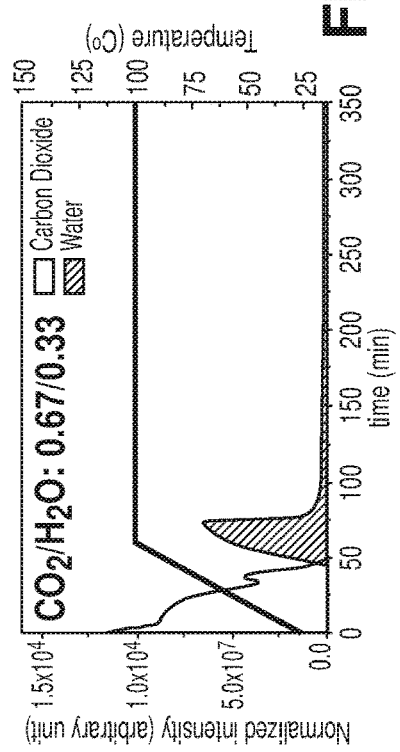
FIGS. 24G-J are graphical views of breakthrough tests, according to one or more embodiments of the present disclosure. G) Breakthrough tests for humid (75% RH) CO$_2$/H$_2$O/N$_2$: 9.2/2/88.8 mixture. Temperature Programmed Desorption revealing the CO$_2$/H$_2$O composition of H) 0.67/0.33 at CO$_2$ breakthrough time, I) 0.24/0.76 at half H$_2$O breakthrough time and J) 0.11/0.89 at H$_2$O breakthrough time.
Figure 24I:
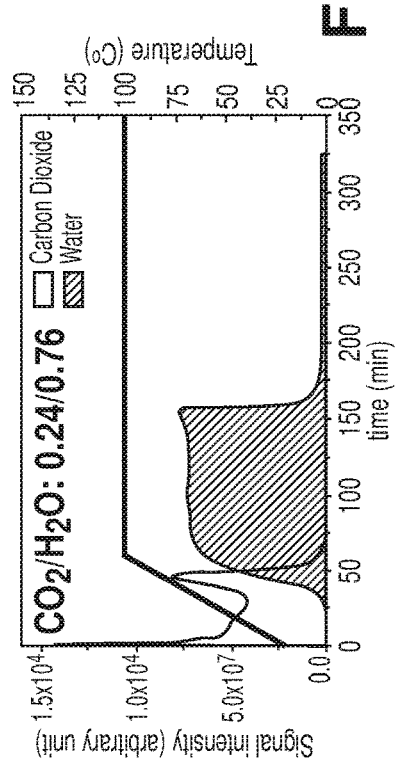
Figure 24J:
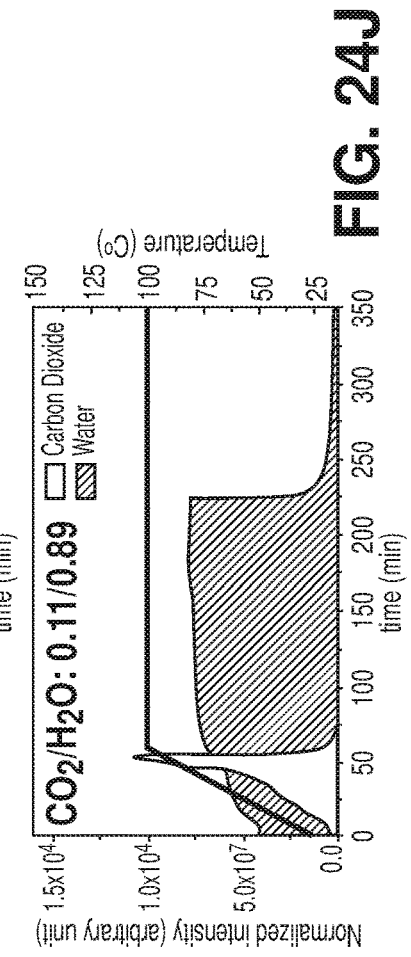
Figure 24G:
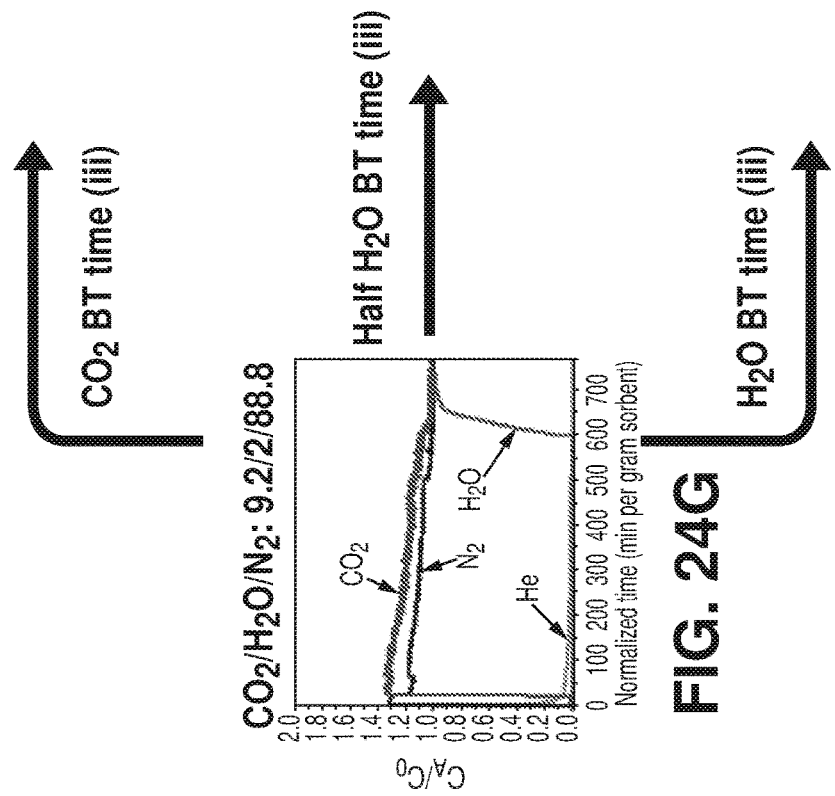

To better understand and further delineate the mechanism occurring during the simultaneous $H_2O$ and $CO_2$ adsorption in hydrated $CO_2/N_2$ and $CO_2/CH_4$ mixtures, subsequent post in-situ Temperature Programmed Desorption (TPD) were performed by progressively heating the column to 100° C., initially saturated with $CO_2/H_2O/N_2$: 9.2/88.8/2 gas feed mixture, at three adsorbed phase states; (i) just after the breakthrough time of $CO_2 \approx 25$ min/g, (ii) at half breakthrough time of $H_2O \approx 300$ min/g and finally (iii) after full breakthrough time of $H_2O \approx 600$ min/g (FIGS. 24H-J). The $H_2O$ and $CO_2$ molecules were simultaneously desorbing from the column with $CO_2/H_2O$ adsorbed phase composition of 0.67/0.33 (FIG. 24H), 0.24/0.76 (FIG. 24I) and 0.11/0.89 (FIG. 24J) at adsorbed phase states i, ii and iii. The above-described results indicated a mutual presence of $CO_2$ and $H_2O$ in the pore system of the $AlFFIVEH_2O$-1-Ni. Analysis of the adsorbed phase composition for the three cases showed that $H_2O$ and $CO_2$ could be simultaneously removed with a $H_2O/CO_2$ selectivity ranging from 2 to 39. Single crystal structure refinement of $AlFFIVEH_2O$-1-Ni simultaneously exposed to air moisture and pure $CO_2$ after activation showed occupancy of 26 and 74% for $CO_2$ and $H_2O$ respectively (FIG. 24B).

DFT calculations were performed for $AlFFIVEH_2O$-1-Ni containing diverse $H_2O$ and $CO_2$ adsorbed amounts in mixture. As a model mixture case (1 $H_2O$+1$CO_2$ per formula unit) FIG. 24A confirmed that both species occupied the same adsorption sites as single components. This result was consistent with the calorimetric measurements of hydrated gas mixture ($CO_2/N_2$:1/99) which showed a similar $CO_2$ and $H_2O$ heat of adsorption as compared to the corresponding values derived from similar measurements with the pure $H_2O$ vapor and $CO_2$ adsorbates (FIG. 24F). This clearly emphasized that there was no competitive adsorption for the two species in mixture, consistent with a simultaneous adsorption/desorption of $CO_2$ and $H_2O$ as depicted from the experimental findings. These results highlighted the potential of the $AlFFIVEH_2O$-1-Ni adsorbent/desiccant to adsorb $CO_2$ and $H_2O$ and could be used for the on-demand simultaneous removal of $CO_2$ and $H_2O$ by varying the adsorption-desorption cycle times.

The whole observations represented an unprecedented discovery and a breakthrough in material development for $CO_2$ capture in the hydrated gas streams and for industrial gases. The simultaneous adsorption of the $H_2O$ and $CO_2$ molecules in the $AlFFIVEH_2O$-1-Ni adsorbent was primarily governed and dominated by adsorption thermodynamic with no discriminating kinetic barrier between the two molecules, $CO_2$ and $H_2O$ can readily access the pore system with no kinetic barrier. In order to ascertain the prospective molecular exclusion cut-off for $MFFIVEH_2O$-1-Ni, imposed by the adsorbent pore shape and size-aperture and subsequently modulating the access to the confined square-shaped channels, the adsorption of slightly bigger and relatively bulkier probe molecules such as n-$C_4H_{10}$, iso-$C_4H_{10}$, 1-propanol and isopropanol (FIGS. 29A-B and FIGS. 30A-B) were explored. Both AlFFIVE-1-Ni and FeFFIVE-1-Ni showed no noticeable adsorption for isobutane and isopropanol indicative of a prospective efficient dehydration of gases/vapors with equal and larger sizes than isobutane and isopropanol via full molecular sieving.

NbOFFIVE-1-Ni

Figure 31:
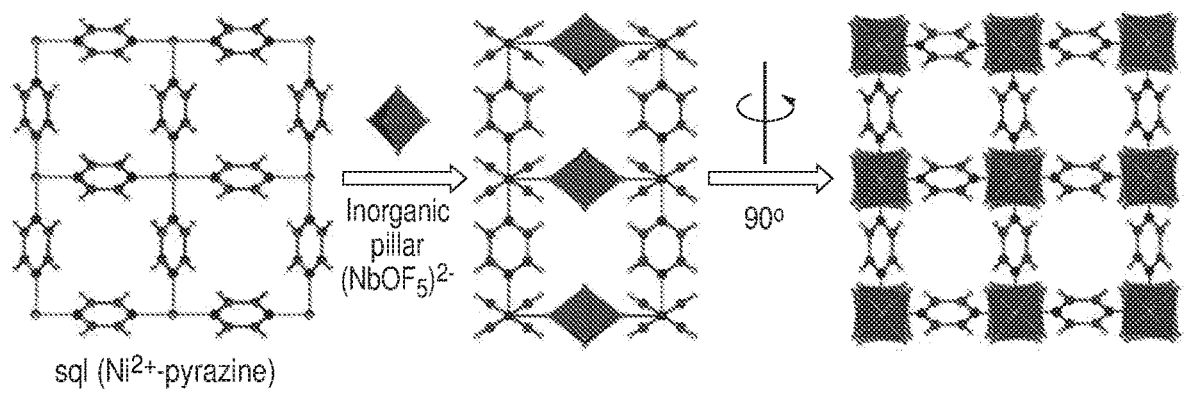
FIG. 31 is a schematic diagram of a structural representation of NbOFFIVE-1-Ni: left, the 2-periodic square-grid layer constructed by linking Ni(II) with pyrazine ligands; middle, pillaring of square-grid layers by the (NbOF5)2-inorganic pillars; right, square-shaped channels in the resultant 3-periodic pcu-MOF, NbOFFIVE-1-Ni, according to one or more embodiments of the present disclosure.

Another example of a hydrolytically stable fluorinated MOF with the appropriate pore system (size, shape, and functionality), ideal for the effective and energy-efficient removal of trace carbon dioxide and water is NbOFFIVE-1-Ni. FIG. 31 is a schematic diagram of a structural representation of NbOFFIVE-1-Ni, the 2-periodic square-grid layer constructed by linking Ni(II) with pyrazine ligands (left), pillaring of square-grid layers by the $(NbOF_5)^{2-}$ inorganic pillars (middle), and square-shaped channels in the resultant 3-periodic pcu-MOF, NbOFFIVE-1-Ni (right), according to one or more embodiments of the present disclosure. Markedly, the CO2- and water-selective NbOFFIVE-1-Ni exhibited the highest CO2 gravimetric and volumetric uptake (ca. 1.3 mmol/g and 51.4 cm$^3$ (STP) cm-3) for a physical adsorbent at 400 ppm of CO2 and 298 K. NbOFFIVE-1-Ni offered the complete CO2 desorption at 328 K under vacuum with an associated moderate energy input of 54 kJ/mol. Noticeably, the contracted square-like channels, according the close proximity of the fluorine centers, permitted the enhancement of the CO2-framework and water interactions and subsequently the attainment of an unprecedented CO2 and water selectivity at very low CO2 and water concentrations.

Figure 32:
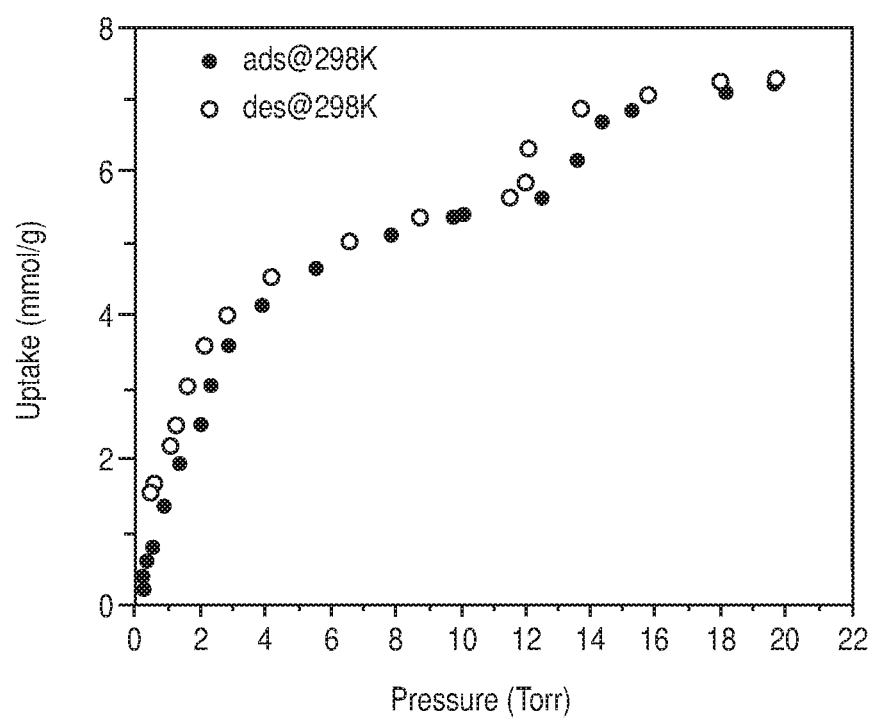
FIG. 32 are graphical views showing $H_2O$ sorption isotherms at 298 K of NbOFFIVE-1-Ni, according to one or more embodiments of the present disclosure.
Figure 33:
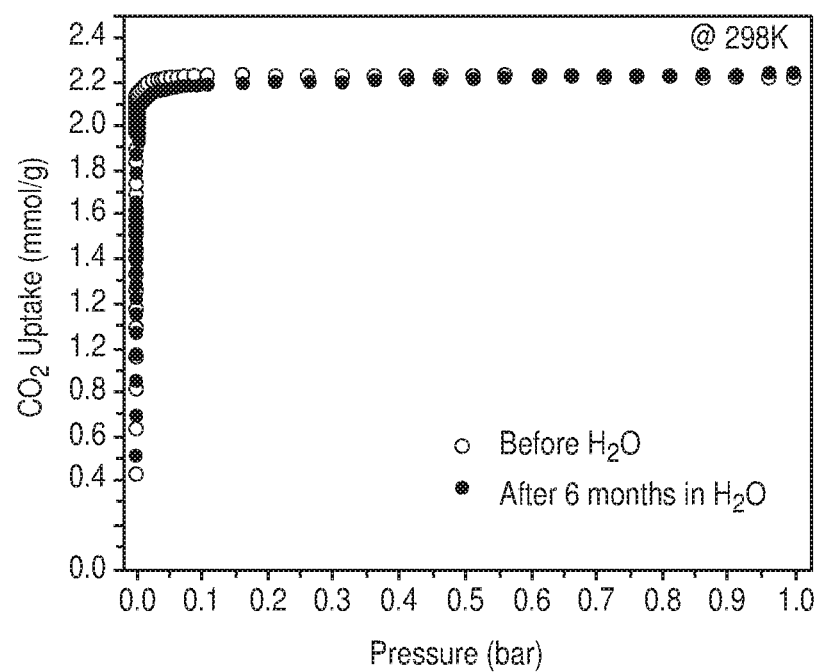
FIG. 33 is a graphical view of the $CO_2$ adsorption isotherms for NbOFFIVE-1-Ni at 298 K, collected before and after the material immersion for six months in water, according to one or more embodiments of the present disclosure.
Figure 34:
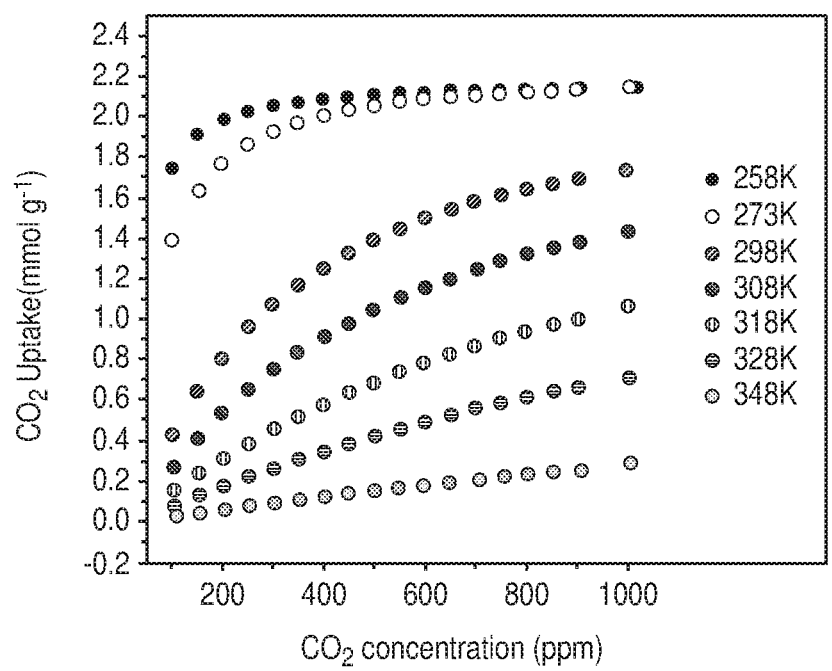
FIG. 34 is a graphical view of $CO_2$ sorption isotherms at 258, 273, 298, 308 and 348 K of NbOFFIVE-1-Ni up to 1000 ppm $CO_2$ concentration, according to one or more embodiments of the present disclosure.
Figure 35:
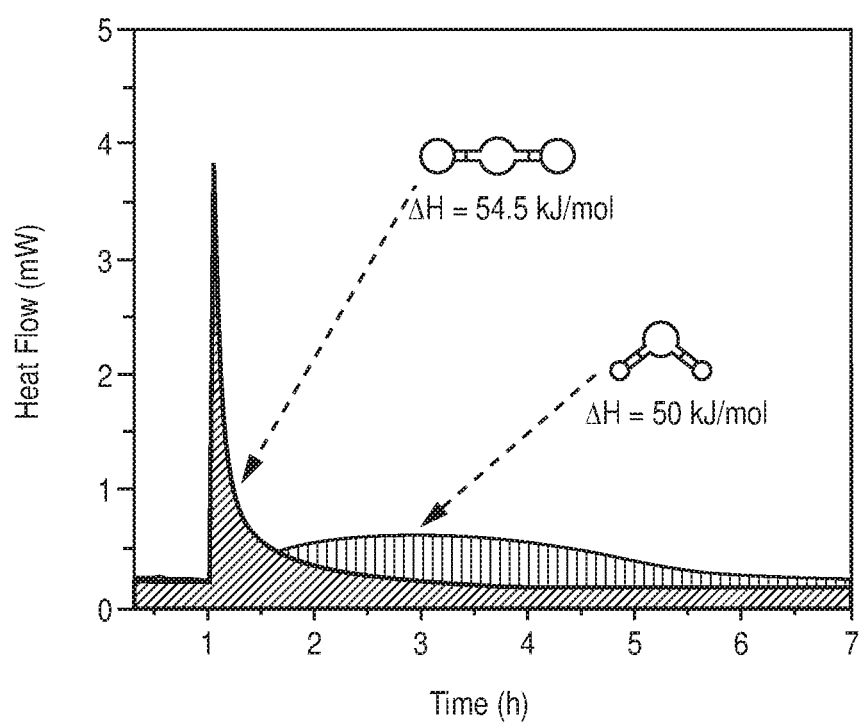
FIG. 35 TG-DSC experiments of NbOFFIVE-1-Ni with $CO_2$ and $H_2O$ at 298 K to determine heat of absorption and uptake simultaneously, according to one or more embodiments of the present disclosure.

FIG. 32 are graphical views showing $H_2O$ sorption isotherms at 298 K of NbOFFIVE-1-Ni, according to one or more embodiments of the present disclosure. FIG. 33 is a graphical view of the $CO_2$ adsorption isotherms for NbOFFIVE-1-Ni at 298 K, collected before and after the material immersion for six months in water, according to one or more embodiments of the present disclosure. FIG. 34 is a graphical view of $CO_2$ sorption isotherms at 258, 273, 298, 308 and 318 K of NbOFFIVE-1-Ni up to 1000 ppm $CO_2$ concentration, according to one or more embodiments of the present disclosure. FIG. 35 TG-DSC experiments of NbOFFIVE-1-Ni with $CO_2$ and $H_2O$ at 298 K to determine heat of absorption and uptake simultaneously, according to one or more embodiments of the present disclosure.

Figure 36:
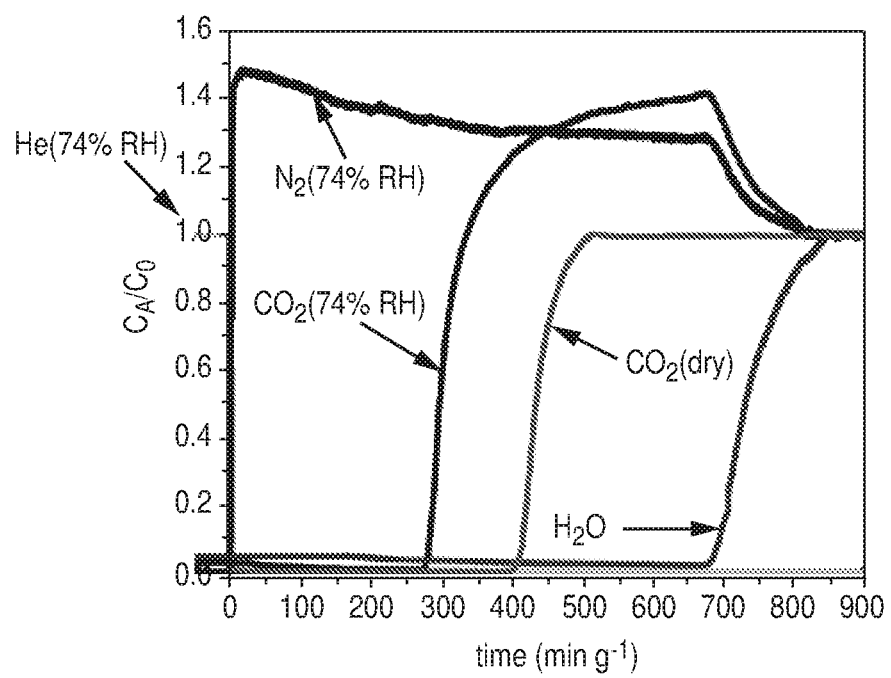
FIG. 36 is a graphical view of column breakthrough tests for NbOFFIVE-1-Ni with the mixed-gas $CO_2/N_2$ (1%/99%) at 1 bar and 298 K under both dry and humid conditions (10 $cm^3$/min flow rate), according to one or more embodiments of the present disclosure.
Figure 37:
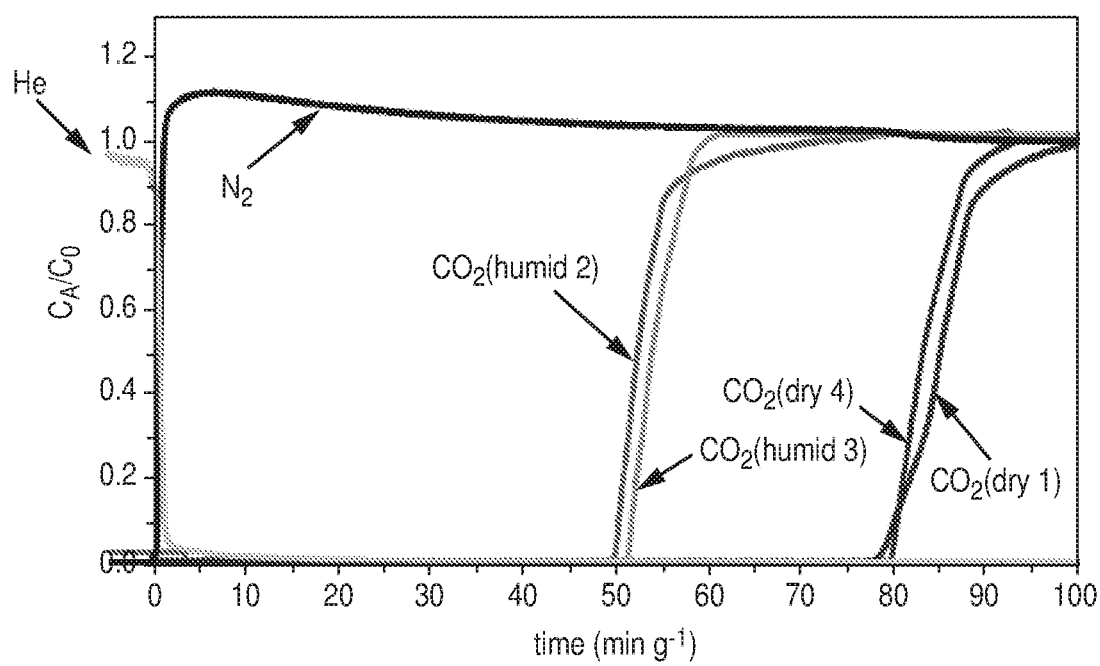
FIG. 37 is a graphical view of Multiple cyclic column breakthrough tests for the NbOFFIVE-1-Ni with the mixed-gas $CO_2/N_2$ (1%/99%) at 1 bar and 298 K in both dry and humid conditions (50 $cm^3$/min flow rate), according to one or more embodiments of the present disclosure. Reproducibility of the retention time before ($CO_2$ dry 1) and after ($CO_2$ dry 4) humid breakthrough experiments ($CO_2$ humid 2 and 3) further establishes the hydrolytic stability of the material.
Figure 38:
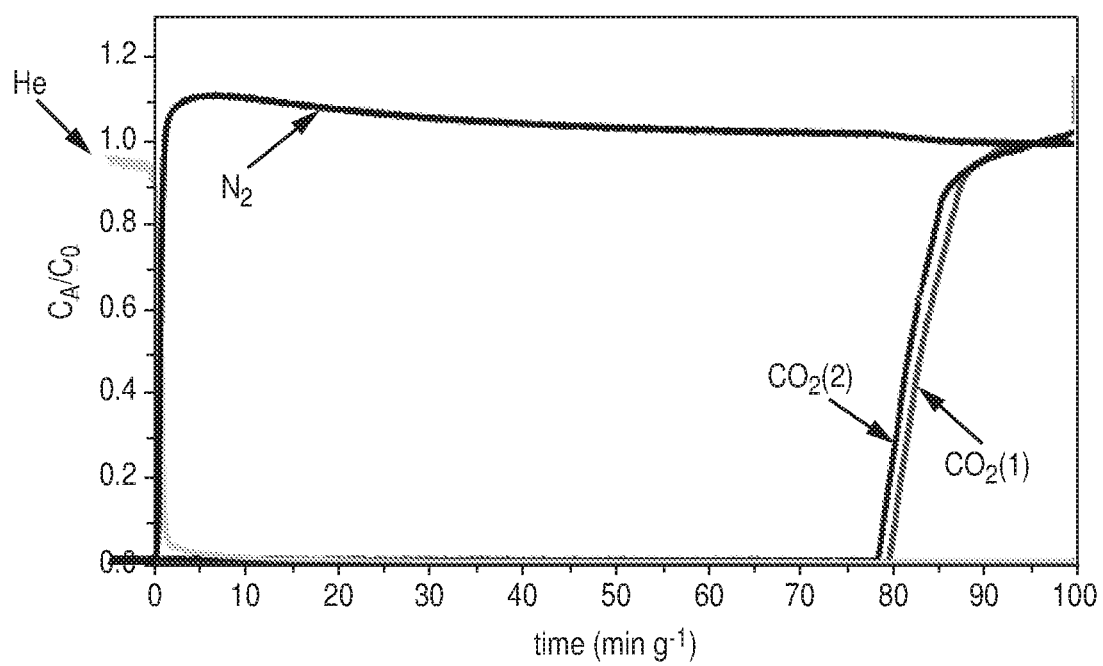
FIG. 38 is a graphical view of regeneration under He flow (50 $cm^3$/min flow rate) at 105° C. for 1 hour results in full recovery of the NbOFFIVE-1-Ni performance as evident from column breakthrough tests with the mixed-gas $CO_2/N_2$ (1%/99%) at 1 bar and 298 K (50 $cm^3$/min flow rate) after usual activation ($CO_2$ (1),105° C., vacuum, 6 hours) and after quick activation ($CO_2$ (2), 105° C., He flow, 1 hour), according to one or more embodiments of the present disclosure.
Figure 39:
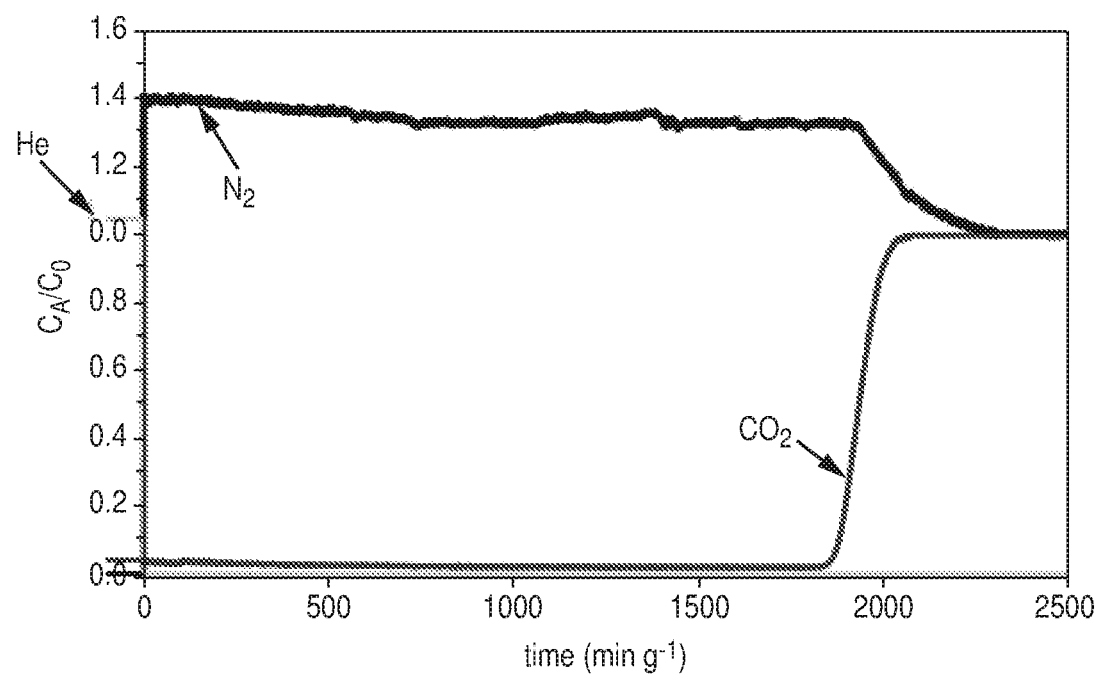
FIG. 39 is a graphical view of column breakthrough experiment for NbOFFIVE-1-Ni with 1000 ppm $CO_2$/balance $N_2$ at 298 K; breakthrough time of 1880 min/g corresponds to 7.4 wt % $CO_2$ uptake, according to one or more embodiments of the present disclosure.

To assert the potential of NbOFFIVE-1-Ni as a proper physical adsorbent for $CO_2$ and $H_2O$ capture at low or dilute concentrations, mixed-gas experiments were performed. A series of cyclic $CO_2$ (1%)/$N_2$ (99%) column breakthrough experiments at 298 K were performed in the presence and absence of water vapor (both dry and humid conditions; FIG. 36). The breakthrough time under dry conditions for a 1% $CO_2$ in the gas stream with the flow rate of 10 cc/min revealed a remarkable retention of 415 min/g that is equivalent to the adsorbed $CO_2$ equaling 8.2 wt %.

The experimental set-up used for dynamic breakthrough measurements is shown in FIG. 3. The gas manifold consisted of three lines fitted with mass flow controllers Line "A" is used to feed an inert gas, most commonly helium, to activate the sample before each experiment. The other two lines, "B" and "C" feed a pure or pre-mixed gases. Whenever required, gases flowing through lines "B" and "C" may be mixed before entering a column packed with NbOFFIVE-1-Ni using a four-way valve. In a typical experiment, 1 g of adsorbent (in the column) was activated at 378 K overnight under vacuum in a separate oven. After the sample is degassed, the column is backfilled with argon and mounted in the set-up. Before starting each experiment, helium reference gas is flushed through the column and then the gas flow is switched to the desired gas mixture at the same flow rate of 10 cm³/g (20 cm³/g in case of 1000 ppm $CO_2$). The gas mixture downstream the column was monitored using a Hiden mass-spectrometer.

Certainly, the CO2 breakthrough time was 283 min/g, with an uptake of 5.6 wt %). In addition, the CO2 uptakes were conserved as proven by the reproducible data from multiple cycle breakthrough experiments, where prior to each new cycle the adsorbent was fully reactivated at 378 K (FIGS. 40-41). The water vapor was retained in the column for 680 min/g, which is equivalent to a water uptake of 13.8 wt %. The noticeable adsorbed water uptake did not jeopardize the carbon dioxide capture capabilities of NbOFFIVE-1-Ni because each of carbon dioxide and water adsorb at distinct sites, permitting the simultaneous adsorption of water and CO2 in contrast to most MOFs and zeolites. Appropriately, column breakthrough experiments for very dilute CO2 concentrations (i.e., 1000 ppm of CO2) with a flow rate of 20 cm3/min showed that CO2 is retained in the column for 1880 min/g with an equivalent uptake of 7.4 wt % (FIG. 42).

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A method of capturing chemical species from a fluid composition, comprising:
    providing a metal-organic framework characterized by the formula $M_aM_bF_5(O/H_2O)(pyrazine)_2 \cdot x(solv)$, wherein $M_a$ is $Ni^{2+}$, $M_b$ is $Nb^{5+}$, $Fe^{3+}$, $Fe^{5+}$, $V^{3+}$, or $V^{5+}$; x is from 0 to 10 and solv is one or more of $H_2O$, $CO_2$, DMF, EtOH, NMP, and MeOH;
    contacting the metal-organic framework with a fluid composition including $H_2O$, $CO_2$, and one or more other chemical species; and
    capturing $H_2O$ and $CO_2$ simultaneously from the fluid composition.

2. The method of claim 1, wherein the metal-organic framework includes one or more of $NiNbOF_5(pyrazine)_2 \cdot x(solv)$ and $NiFeF_5(H_2O)(pyrazine)_2 \cdot x(solv)$.

3. The method of claim 1, wherein the metal-organic framework includes a periodic array of open metal coordination sites and fluorine moieties within a contracted square-shaped one-dimensional channel.

4. The method of claim 1, wherein the one or more other chemical species are selected from $N_2$, $H_2$, $CH_4$, $n-C_4H_{10}$, $iso-C_4H_{10}$, 1-propanol, and isopropanol.

5. The method of claim 1, wherein the one or more other chemical species further includes a linear hydrocarbon and/or branched hydrocarbon.

6. The method of claim 1, wherein $H_2O$ and $CO_2$ are preferentially captured at distinct adsorption sites of the metal-organic framework.

7. The method of claim 1, wherein $H_2O$ is captured at open metal coordination sites of the metal-organic framework.

8. The method of claim 1, wherein $CO_2$ is preferentially captured via interactions with one or more of fluorine atoms of pillars and hydrogen atoms of pyrazine.

9. The method of claim 1, wherein capturing $H_2O$ and $CO_2$ is non-competitive.

10. The method of claim 1, wherein the capturing of $H_2O$ is independent of $CO_2$ concentration of the fluid composition and the presence of the one or more other chemical species in the fluid composition.

11. The method of claim 1, wherein the metal-organic framework selectively adsorbs $H_2O$ and $CO_2$ over the one or more other chemical species of the fluid composition.

12. The method of claim 1, wherein a $H_2O/CO_2$ selectivity ranges from about 2 to about 39.

13. The method of claim 1, wherein the metal-organic framework is saturated with $H_2O$ at a partial pressure of about 0.5 $P/P_0$.

14. The method of claim 1, wherein the metal-organic framework is saturated with $CO_2$ at a partial pressure of about 0.5 $P/P_0$.

15. The method of claim 1, wherein the metal-organic framework is regenerated at a temperature of about 150° C. or less.

16. The method of claim 15, wherein the regeneration temperature is about 105° C.

17. The method of claim 1, wherein the metal-organic framework exhibits structural relaxation of host framework upon dehydration and re-activation.

18. A method of capturing chemical species from a fluid composition, comprising:
   providing a metal-organic framework, the metal-organic framework including a pillar characterized by the formula $(M_b F_5(o/H_2O))^{2-}$, where $M_b$ is a metal cation with a +3 or +5 oxidation state;
   contacting the metal-organic framework with a fluid composition including $H_2O$, $CO_2$, and one or more other chemical species; and
   capturing $H_2O$ and $CO_2$ simultaneously from the fluid composition.

19. The method of claim 17, wherein $M_b$ includes one or more of $Fe^{3+}$, $La^{3+}$, $Rh^{3+}$, $Ti^{3+}$, $Cr^{3+}$, $Ga^{3+}$, $In^{3+}$, $Fe^{5+}$, $Sc^{3+}$, $Y^{3+}$, $V^{3+}$, and $V^{5+}$.

* * * * *